United States Patent
Ma

(10) Patent No.: US 11,268,275 B2
(45) Date of Patent: Mar. 8, 2022

(54) FLOATING BODY DEVICE FOR SUPPRESSING VIBRATION OF TOWER

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 839 days.

(21) Appl. No.: 15/999,662

(22) PCT Filed: Feb. 26, 2018

(86) PCT No.: PCT/CN2018/077197
§ 371 (c)(1),
(2) Date: Aug. 20, 2018

(87) PCT Pub. No.: WO2019/047485
PCT Pub. Date: Mar. 14, 2019

(65) Prior Publication Data
US 2021/0222427 A1 Jul. 22, 2021

(30) Foreign Application Priority Data
Sep. 11, 2017 (CN) .......................... 201710812908.6

(51) Int. Cl.
*F03D 13/25* (2016.01)
*E04B 1/98* (2006.01)
(Continued)

(52) U.S. Cl.
CPC ............... *E04B 1/98* (2013.01); *E04H 12/00* (2013.01); *F03D 13/20* (2016.05); *F05B 2260/96* (2013.01)

(58) Field of Classification Search
CPC ..... Y02E 10/72; Y02E 10/727; Y02E 10/728; B63B 2035/446; B63B 35/44; F03D 13/25; F03D 13/20
See application file for complete search history.

(56) References Cited

U.S. PATENT DOCUMENTS 2,784,556 A * 3/1957 Perdue .................... F03D 80/70
60/398
9,321,518 B1 * 4/2016 Rabbi ....................... F03D 5/00
(Continued)

FOREIGN PATENT DOCUMENTS

| CN | 102134972 A | 7/2011 |
| CN | 103114659 A | 5/2013 |

(Continued)

OTHER PUBLICATIONS

The First Indian Office Action dated Jun. 17, 2020; Appln. No. 201817032038.

(Continued)

*Primary Examiner* — Babajide A Demuren
*Assistant Examiner* — Daniel J Kenny

(57) ABSTRACT

A floating body device for suppressing vibration of enclosure includes a floating body surrounding the enclosure and an excitation device which can excite the floating body to float up and down. The excitation device includes a tether connected to the floating body to prevent the floating body from falling off from the enclosure. When the floating body floats up and down, an airflow boundary layer on an outer wall of a tower can be destroyed, and a cause of vortex-induced vibration can be directly suppressed. In addition, a change of an aerodynamic configuration is obtained. The up (Continued)

and down floating of the floating body disrupts both upper and lower sections of a nearby flow field, thus weakening a combined action thereof, thereby preventing the vortex induced vibration of the tower.

17 Claims, 22 Drawing Sheets

(51) Int. Cl.
*F03D 13/20* (2016.01)
*E04H 12/00* (2006.01)

(56) References Cited

U.S. PATENT DOCUMENTS

| | | | | |
|---|---|---|---|---|
| 9,650,157 | B2* | 5/2017 | GilroySmith | F03D 7/02 |
| 10,442,510 | B2* | 10/2019 | Prieto | B63B 35/44 |
| 2010/0061809 | A1* | 3/2010 | Allen | B63B 39/005 |
| | | | | 405/216 |
| 2013/0236309 | A1 | 9/2013 | Rossetti | |
| 2015/0097086 | A1* | 4/2015 | Schaefer | B64C 39/022 |
| | | | | 244/175 |

FOREIGN PATENT DOCUMENTS

| | | |
|---|---|---|
| CN | 203594056 U | 5/2014 |
| CN | 104061111 A | 9/2014 |
| CN | 104842706 A | 8/2015 |
| CN | 105020106 A | 11/2015 |
| CN | 105041573 A | 11/2015 |
| CN | 204900165 U | 12/2015 |
| CN | 105388926 A | 3/2016 |
| CN | 105888567 A | 8/2016 |
| CN | 106499352 A | 3/2017 |
| CN | 107013418 A | 8/2017 |
| CN | 107387334 A | 11/2017 |
| DE | 102008008760 A1 | 8/2009 |
| FR | 2818327 A1 | 6/2002 |
| JP | 58-192977 A | 11/1983 |
| WO | 2009/094353 A1 | 7/2009 |

OTHER PUBLICATIONS

The Extended European Search Report dated May 7, 2019; Appln. No. 18753040.7.
The International Search Report dated May 24, 2018; PCT/CN2018/077197.

* cited by examiner

FLOATING BODY DEVICE FOR SUPPRESSING VIBRATION OF TOWER

The present application is the national phase of International Application No. PCT/CN2018/077197, titled "FLOATING BODY DEVICE FOR SUPPRESSING VIBRATION OF TOWER", filed on Feb. 26, 2018, which claims the benefit of priority to Chinese Patent Application No. 201710812908.6 titled "FLOATING BODY DEVICE FOR SUPPRESSING VIBRATION OF TOWER", filed with the Chinese State Intellectual Property Office on Sep. 11, 2017, the entire disclosures of which applications are incorporated herein by reference.

FIELD

The present application relates to the technical field of wind power technology, and particularly relates to a floating body device for suppressing vibration of tower.

BACKGROUND

Reference is made to FIG. 1-1, which is a schematic view showing the configuration of a wind power generation equipment.

The base of the wind power generation equipment is a tower 10, which functions to carry and enclose the entire system. Taking the tower 10 having a circular cross-section as an example, the tower 10 may be a steel cylinder or a combination of a steel cylinder and a concrete cylinder. The tower 10 carries a nacelle 30, an electric generator, and a rotor 20 of the wind power generation equipment. A wind turbine generator system including the tower 10, the rotor 20, the nacelle 30 and the electric generator performs the task of obtaining the wind energy and converting the wind energy into electric energy. The converted electric energy is transmitted via a power transmission cable 40 or a power transmission busbar, the power transmission cable 40 shown in the figure is led out from the nacelle 30 and is position-limited by a cable retaining ring at a top of the tower 10, the cable retaining ring is fixed on the cable retaining ring fixing plate 50, and then the power transmission cable 40 passes a saddle bracket 60 and hangs down along an inner wall of the tower 10 to a converter cabinet 70. A lower end of the tower 10 is further provided with a tower door 80.

The converted electric energy is controlled by a switch cabinet of the wind power generator system, and is transmitted, by means of the power transmission cable 40 or the power transmission busbar, to a converter (in the converter cabinet 70) which performs electric power conversion task, and then, after being processed by the converter, the electric energy that can meet the grid connection rules can be obtained. Therefore, it can be said that the tower 10 of the wind power generation equipment is a tower pole of wind power generation, and mainly plays a supporting role in the wind power generation equipment.

In addition, the tower 10 carries structural wind loads generated by the nacelle 30, the rotor 20 and the electric generator, or downwind and crosswind vibrations induced by the structural wind loads, i.e., wind-induced structural vibration issue.

Reference is made to FIG. 1-2, which is a schematic view showing hoisting of the tower in sections.

Currently, the tower 10 is usually installed in sections. As shown in FIG. 1-2, from bottom to top, a first tower section 11, a second tower section 12, a third tower section 13, a fourth tower section 14 and a fifth tower section 15 are sequentially arranged. In an installation process of the wind power generation equipment, the first tower section 11 is installed on a foundation base 90 of the tower 10 first, then other tower sections are hoisted section by section, and after the tower sections are connected to each other, a top (the fifth tower section 15 in FIG. 1-2) of the tower 10 is connected to a yaw system of the nacelle 30, the nacelle 30 is butted to the electric generator, and then the electric generator (or a gearbox) is butted to the rotor 20.

A specific hoisting process is described as follows:

before hoisting the tower 10, first cleaning a foundation ring of the foundation base 90 connected to the first tower section 11, placing multiple bolts (for example, 120 bolts) at an inner ring of the foundation ring after oiling threads of the multiple bolts, and at the same time hoisting a control cabinet of the wind power generation equipment into the foundation ring;

installing a hoisting tool on an upper end of the first tower section 11, where a main crane undertakes hoisting the upper end of the first tower section 11, and installing a hoisting tool on a lower end of the first tower section 11 at the same time, where an auxiliary crane of the tower undertakes hoisting; the two cranes hoisting at the same time, in a case that a height of the first tower section 11 is greater than a maximum diameter of the first tower section 11, the main crane hoists the upper end of the first tower section 11, and the auxiliary crane stops; after the first tower section 1 is hoisted to a position vertical to the ground, moving the auxiliary crane away and demounting the hoisting tool at the lower end of the first tower section 11;

after connecting a flange face of the first tower section 11, mounting the bolts from bottom to top, tightening nuts with an electric wrench after mounting the nuts, the nuts are tightened for at least 3 times (after hoisting procedures of the entire wind power generation equipment are finished, using a torque wrench to tighten the nuts for tower connection to achieve a required torque value);

hoisting processes of the rest tower sections are the same as the first tower section 11, and after finishing hoisting an uppermost tower section, preparing to hoist the nacelle.

The above installation procedures of butting and connecting are carried out under conditions of unpredictable local winds in a small area environment of a wind power plant. Therefore, during the hoisting and installation processes, gusts of varying strength or continuous small winds are often encountered. As described above, these gusts or continuous winds may induce vibrations of the tower, destroying the stability of the enclosure, endangering the safety of people and equipment on the scene, and delaying the installation period. For example, after the fourth tower section 14 is hoisted, the fourth tower section 14 vibrates, resulting in that the fifth tower section 15 cannot be aligned with the fourth tower section 14, and the tightened bolts may even break under the action of vibration, thereby endangering the safety.

At present, it is clearly stipulated by the engineering safety requirements of hoisting processes in the wind power industry that, when a wind speed is greater than 6 m/s, the hoisting of a vane assembly is prohibited; when the wind speed is greater than 8 m/s, the hoisting of the nacelle is prohibited; and when the wind speed is greater than 10 m/s, the hoisting of the tower is prohibited. It can be seen that the on-site hoisting schedule and installation period are obviously limited by the wind conditions in the local area. For the construction of the wind power plant in high-altitude and high mountain areas, the installation period is more apt to be affected.

References are made to FIGS. 2 to 3-6. FIG. 2 is a schematic view showing the structure of a tower having a certain vibration suppressing function; FIGS. 3-1 to 3-6 are schematic views showing the relationships between cylindrical vortex shedding (surrounding flow detachment) and six intervals of Reynolds number respectively. From FIG. 3-1 to FIG. 3-6, the six intervals of Reynolds number (Re) are respectively, $Re<5$, $5<Re<15$, $40<Re<50$, $150<Re<3\times10^5$, $3\times10^5<Re<3\times10^6$, $Re>3\times10^6$.

According to different patterns of airflow flowing around structures of objects, the structures are sorted into blunt bodies and floating bodies such as aircraft wings or sails.

In the case that $Re<5$, the fluid flow may adhere to an entire surface of a cylindrical body, that is, the flow is not separated.

In the case that $5<Re<40$, the flow is still symmetrical, but flow separation occurs, two symmetrically arranged stable vortices are formed at a leeward side, and the vortices are elongated outward as Reynolds number increases, resulting in deformation.

In the case that $40<Re<150$, starting from that Reynolds number $Re=40$, the vortices may alternately shed from a tail portion of the surface of the cylindrical body, and flow into a fluid near the back of the cylindrical body to form a shear layer; the unstable shear layer soon rolls into vortexes to flow downstream, to form Karman vortex street, that is, the vortex-induced vibration. At this time, the vortex shedding is regular and periodic.

In the case that $150<Re<300$, which corresponds to a period of transition from laminar flow to turbulent flow, during this period, the periodic vortex shedding is covered by irregular turbulence flow.

In the case that $300<Re<3\times10^5$, which is called a subcritical region, awake flow of the cylindrical body after falling off appears mainly as a turbulent wake flow, and the vortex shedding begins to be irregular. The period of a vortex shedding frequency can be roughly determined, but a disturbing force when the vortices are shedding is random rather than symmetrical.

In the case that $3\times10^5<Re<3\times10^6$, which is called a supercritical region, a vortex shedding point moves backward, the vortex street cannot be identified, and a completely aperiodic vortex is formed.

In the case that $3\times10^6<Re$, which is called a trans-critical region, a wake flow behind the cylindrical body is very turbulent, however, a regular vortex shedding also appears.

When uniform airflow passes (sweeps, flows around) a blunt body (cylindrical body), the periodic vortex shedding behind a cross section of the cylindrical body may generate a periodically varying force, that is, a vortex-induced force, on a structure (a contact face on a surface of the tower). A lower end of the tower structure around which the airflow flows and the foundation base under the ground constitute a single free end vibration system (that is, the upper end of the tower is submerged in the airflow, and a lowermost end of the tower is fixed on the foundation base). When the vortex shedding frequency is consistent with a certain order natural vibration frequency of the tower structure, the periodic vortex-induced force (unbalanced force) on the surface of the tower may cause a vortex-induced resonance response of the tower system structure.

The condition that the vortex shedding frequency is equal to the natural frequency of the vibration system of the tower of a structural system and the base thereof can be satisfied only at a certain wind speed. However, the vibration system of the tower and the base thereof which has a natural frequency may generate some feedback on the vortex shedding, so that the vortex shedding frequency can be "captured" by the vibration frequency of the vibration system of the tower and the base thereof within a certain wind speed range, and the vortex shedding frequency may not change with the changing of the wind speed within this wind speed range. This phenomenon is called locking, and the locking may expand the wind speed range within which the vortex-induced resonance of the tower structure occurs.

The height of the tower of a modern large-scale megawatt-level wind turbine generator system can reach 60 m to 100 m. The top of the tower 10 is mounted with main components such as a main frame, a sub-frame, a wheel hub and blades (i.e., the rotor 20) and the like. When the wind turbine generator system is in operation, the tower 10 not only bears the loads of both the gravities of the components at the top of the tower 10 and the dynamic load generated by the rotation of the rotor, but also is impacted by the natural wind, including downwind and crosswind impacting forms. A bending moment and a force are applied on the tower when the wind blows the rotor to rotate, and the bending moment and the force generated in downwind direction are the main reasons for the damage of the tower 10. The turbulence generated when the wind flows around the tower 10 also causes a lateral vibration leading to the resonance damage of the tower 10.

When the wind blows across the tower 10, pairs of anti-symmetric vortices alternately arranged and having opposite rotation directions are generated at left and right sides of the wake flow, that is, the Karman vortices. The vortices shed from the tower 10 at a certain frequency, so that a transverse vibration perpendicular to the wind direction of the tower 10 occurs, which is also called a wind-induced lateral vibration, i.e., the vortex-induced vibration. When the vortex shedding frequency is close to the natural frequency of the tower, the tower 10 is apt to generate resonance, thus being destroyed.

Referring to FIG. 3, a spiral wire 10a (or a spiral plate) is wound around an outer wall of the tower 10 to suppress vortex shedding on the surface of the tower 10. The spiral wire 10a (or the spiral plate) has different lateral vibration suppression effects when being arranged at different screw pitches. The increase of the height of the spiral wire 10a is beneficial for damaging a period of vortex street releasing, thus the generation and release of the vortex street are more irregular, which is beneficial for suppressing the vortex-induced vibration. And meanwhile, the noise and the resistance generated in front and at the back of the tower gradually increase, and a pitching vibration amplitude along the wind direction is increased.

The above technical solution has the following technical problem:

The wind speed of the airflow changes, and on condition that the characteristic parameters (screw pitch, height) of the spiral wire 10a (or the spiral plate) are processed to change depending on the wind speed of the airflow, the corresponding manufacturing cost and maintenance cost may be significantly increased.

In view of this, a technical issue to be addressed by those skilled in the art is to improve the situation that the installation of the wind power generation equipment is restricted by the regional wind condition.

SUMMARY

A floating body device for suppressing vibration of enclosure is provided according to the present application, which can improve the situation that the installation and using of an enclosure is restricted by a regional wind condition.

A floating body device for suppressing vibration of enclosure according to the present application includes a floating body surrounding the enclosure and an excitation device which can excite the floating body to float up and down; wherein the excitation device includes a tether connected to the floating body to prevent the floating body from falling off from the enclosure.

Optionally, the excitation device further includes a rope actuator, one end of the tether is connected to the floating body, the other end of the tether is connected to the rope actuator; the rope actuator controls the tether to extend and retract, so as to actively excite the floating body to float up and down.

Optionally, the rope actuator includes a winch wound around by the tether and a servo motor used to control the winch to rotate.

Optionally, the floating body device for suppressing vibration of enclosure further includes a pulley, wherein the tether is connected to the rope actuator via the pulley, and the pulley maintains the tether to pull the floating body in a vertical direction.

Optionally, the floating body device for suppressing vibration of enclosure includes at least two tethers controlled by the same rope actuator to extend and retract, wherein each of the tethers enters the same rope actuator via the corresponding pulley.

Optionally, the pulleys corresponding to the tethers each includes a guiding pulley and a height-limiting pulley; an outer side of the tether is wound around the guiding pulley, then a direction of the tether is turned to be parallel with a direction of the extension and retraction controlled by the rope actuator, and the tether is connected to the rope actuator via the height-limiting pulley; the height-limiting pulley is fixed with respect to the enclosure. The floating body device for suppressing vibration of enclosure further includes a rotating ring, wherein the rotating ring runs through each of the guiding pulleys, and the rotating ring functions as an axle of all the guiding pulleys.

Optionally, the guiding pulleys are bearings.

Optionally, the floating body device for suppressing vibration of enclosure further includes a follow-up system supporting and rotating platform on which the rope actuator is arranged, a track fixed on a foundation base or the enclosure, and a driving motor used to drive the follow-up system supporting and rotating platform to move along the track. The follow-up system supporting and rotating platform rotates around the enclosure when moving along the track, to allow the tethers, the rope actuator and the floating body to follow.

Optionally, a bottom of the follow-up system supporting and rotating platform is provided with rolling wheels moving along the track.

Optionally, the follow-up system supporting and rotating platform is provided with a balance weight.

Optionally, the floating body device for suppressing vibration of enclosure further includes a controller, wherein the controller controls the rope actuator and/or the driving motor to start or stop.

Optionally, the floating body device for suppressing vibration of enclosure further includes a vibration monitoring element for detecting the vibration of the enclosure and/or a wind speed sensor for measuring a wind speed at a location where the enclosure is located, wherein the controller controls the rope actuator to start or stop according to a detected vibration signal and/or a detected wind speed signal.

Optionally, the controller controls a reciprocating extension/retraction range and a reciprocating extension/retraction speed of the tether by the rope actuator.

Optionally, the floating body device for suppressing vibration of enclosure further includes a height detecting element (707') for detecting a height at which the floating body is located, wherein the controller controls, according to the detected height, an extension/retraction range of the tether driven by the rope actuator.

Optionally, the controller combines a change of the vibration signal after the floating body is driven by the reciprocating extension/retraction of the tether to rise and fall, and the height where the floating body is located, to analyze a vibration controlling law of the floating body under a predetermined wind speed and height, so as to control the float body to determine a range and speed of the rise and fall according to the wind speed and height.

Optionally, the floating body device for suppressing vibration of enclosure further includes a wireless receiver for receiving a signal from the height detecting element, wherein the height detecting element is arranged on the floating body, and the wireless receiver is arranged on the follow-up system supporting and rotating platform.

Optionally, the floating body device for suppressing vibration of enclosure further includes a wind indicator for detecting a wind direction of a location where the enclosure is located, wherein the controller controls the driving motor according to the detected wind direction, to make the follow-up system supporting and rotating platform follow the floating body to rotate; or, the floating body device for suppressing vibration of enclosure further includes a direction detecting element for detecting a direction of the floating body, wherein the controller controls the driving motor according to the detected direction of the floating body, to make the follow-up system supporting and rotating platform follow the floating body to rotate.

Optionally, the floating body has a streamlined front edge, and the front edge can face toward an upwind incoming flow, to allow the upwind incoming flow to form a positive attack angle and/or a negative attack angle. The floating body also has a tail portion opposite to the front edge, and a distance between the front edge and an outer wall of the enclosure is smaller than a distance between the tail portion and the outer wall of the enclosure, so that under an action of the upwind incoming flow, the front edge can automatically align with the upwind incoming flow.

Optionally, the tether is an elastic tether, or the tether has at least one elastic section, to collect the turbulent fluctuating energy of the upwind incoming flow, to excite and enlarge an up and down floating range of the floating body.

Optionally, the floating body is annular, and a lateral dimension of a central through-hole of the floating body satisfies the requirement that, at a top of the enclosure, a predetermined distance is provided as a gap between an inner wall of the central through-hole of the floating body and the outer wall of the enclosure, to break a buoyancy force generated by the upwind incoming flow, so as to achieve self-balance.

Optionally, the enclosure includes a tower of a wind turbine generator system, a television tower or an anemometer tower.

The floating body according to the present application is provided with an excitation device. The excitation device can urge the floating body to float up and down. When the floating body floats up and down to perform "sweeping", it is equivalent that an airflow boundary layer at the outer wall of the tower is continuously "refreshed", thus the airflow boundary layer at the outer wall of the tower is destroyed. According to the formation principle of the Karmen vortex street vibration described in the background, after the boundary layer is destroyed, the formation of the vortices at two sides behind the tower is prevented, which directly suppresses the cause of the vortex-induced vibration.

In addition, due to a change of the up and down floating of the floating body, when the upwind incoming flow flows around the tower to come into contact with the floating body, a change of an aerodynamic configuration is obtained, thus the aerodynamic configuration and an attack angle of the upwind incoming flow are further changed. Then, an aerodynamic coefficient C of the tower with respect to the streamlined bypassing airflow is smaller, it can be understood that a resistance is reduced, which can also reduce a vibration amplitude A of a vortex-induced resonance and reduce the vibration.

Quantitative analysis may be further performed. When the aerodynamic configuration becomes oval, the aerodynamic coefficient C can be reduced from a general value of 1.2 to about 0.6 or even smaller, thus the resistance can be greatly reduced, thereby the vibration can be reduced. It can be understood vividly that, when the upwind incoming flow sweeps across the tower horizontally, the aerodynamic configuration in contact with the outer surface of the tower is circular, which belongs to the blunt body. The wind direction is required to be changed suddenly, which may cause a great unbalanced force. However, after the attack angle changes, the aerodynamic configuration is oval, a backward (that is, downwind direction) moving track of the fluid (that is, the airflow) along the surface of the tower is elongated, a contact angle between the fluid and the outer wall of the tower changes, and since the airflow rises, the contact angle becomes smaller, and changes slowly according to the wind direction, it is beneficial to suppress the occurrence of the bypassing flow shedding of the airflow flowing around the outer wall of the tower, so as to suppress the generation of crosswind unbalanced force of the tower, and thus to reduce the vibration caused by the unbalanced force in a coupling process of the airflow and the outer wall of the tower.

The up and down floating of the floating body not only destroys the airflow boundary layer on the outer wall of the tower 100, but also disrupts both upper and lower sections of a nearby flow field actually, thus disrupting the correlation of the upwind airflow close to the floating body 200. The correlation of upwind airflow is disturbed, which in turn disturbs the consistency of airflow vortex shedding frequency between the floating body and other positions, thus weakening a combined action thereof, reducing or preventing the vortex-induced response of the bypassing flow shedding of the boundary layer on the outer wall of the tower, thereby preventing the vortex induced vibration of the tower.

BRIEF DESCRIPTION OF THE DRAWINGS

FIG. 1-2 is a schematic view showing hoisting of the tower in sections;
FIG. 2 is a schematic view showing the structure of a tower having a certain vibration suppressing function;

FIG. 3-1 to FIG. 3-6 are schematic views showing the relationships between cylindrical vortex shedding (bypassing flow shedding) and six intervals of Reynolds number respectively.
FIG. 4 is a schematic view showing the structure of a tower surrounded by a floating body according to a specific embodiment of the present application;
FIG. 5-1 is a partially enlarged schematic view showing a portion A in FIG. 4;
FIG. 5-2 is a top view showing the floating body surrounding the tower in FIG. 4;
FIG. 5-3 is a top view showing the floating body in FIG. 4;
FIG. 5-4 is a partially enlarged schematic view showing a portion 1 in FIG. 5-3;
FIG. 5-5 is a schematic view showing the floating body in FIG. 4 swinging with the change of a wind direction of the upwind incoming flow;
FIG. 6 is a schematic view showing a wing-shaped attack angle.

Figure 1:
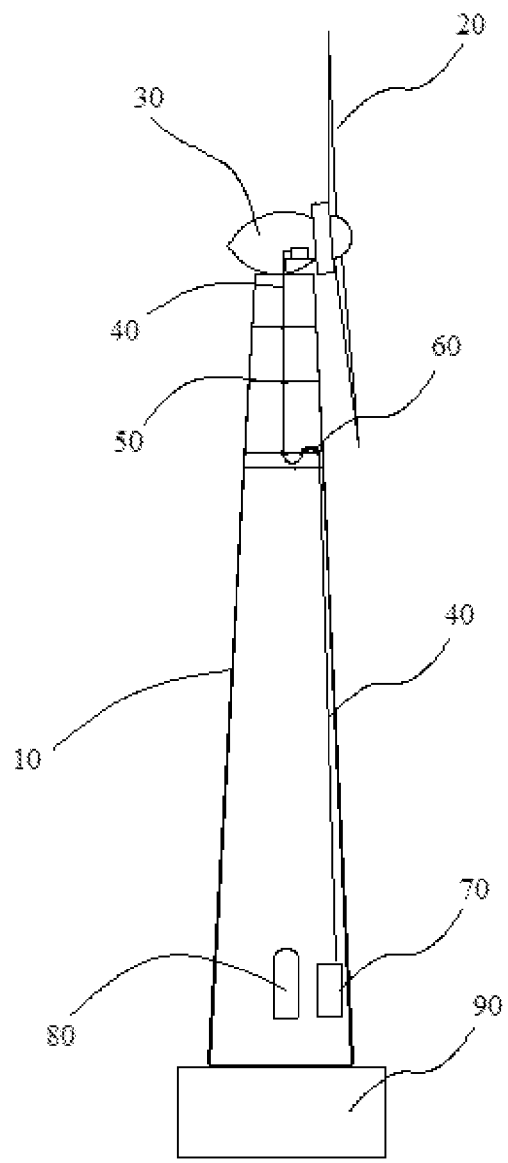
FIG. 1-1 is a schematic view showing the configuration of wind power generation equipment.

| | | | |
|---|---|---|---|
| 10 | tower, | 11 | first tower section, |
| 12 | second tower section, | 13 | third tower section, |
| 14 | fourth tower section, | 15 | fifth tower section, |
| 10a | spiral wire, | 20 | rotor, |
| 30 | nacelle, | 40 | power transmission cable, |
| 50 | cable retaining ring fixing plate, | 60 | saddle bracket, |
| 70 | converter cabinet, | 80 | tower door, |
| 90 | foundation base; | | |

Reference numerals in FIGS. 4 to 24:

| | | | |
|---|---|---|---|
| 100 | tower, | 101 | first tower section, |
| 102 | second tower section, | 103 | third tower section, |
| 104 | fourth tower section, | 105 | fifth tower section, |
| 200 | floating body, | 201 | front edge, |
| 202 | tail portion, | 203 | elastic sphere, |
| 203a | hidden portion, | 203b | exposed portion, |
| 204 | valve core, | 205 | internal pipeline, |
| 206 | wireless electronic lock, | 207 | central through-hole, |
| 200a | outer side outer surface, | 200b | inner side outer surface, |
| 200c | butting face, | 300 | foundation base, |
| 400 | nacelle, | 401 | gas collecting device, |
| 402 | recovery opening, | 403 | recovery pipe, |
| 500 | rotor, | 600 | tether, |
| 601 | tether section, | 602 | spring section, |
| 701 | first guiding pulley, | 702 | first height-limiting pulley, |
| 703 | second guiding pulley, | 704 | second height-limiting pulley, |
| 705 | rotating ring, | 706 | rope actuator, |
| 707 | wireless receiver, | 707' | height detecting element, |
| 800 | follow-up system supporting and rotating platform, | | |
| 801 | driving motor, | 802 | rolling wheel, |
| 803 | track, | S | gap, |
| R | convergent-divergent flow channel, | | |
| R1 | convergent flow channel, | | |
| R2 | throat, | R3 | divergent flow channel. |

DETAILED DESCRIPTION

For those skilled in the art to better understand technical solutions of the present application, the present application may be further described in detail in conjunction with drawings and embodiments hereinafter.

Figures 1, 2:
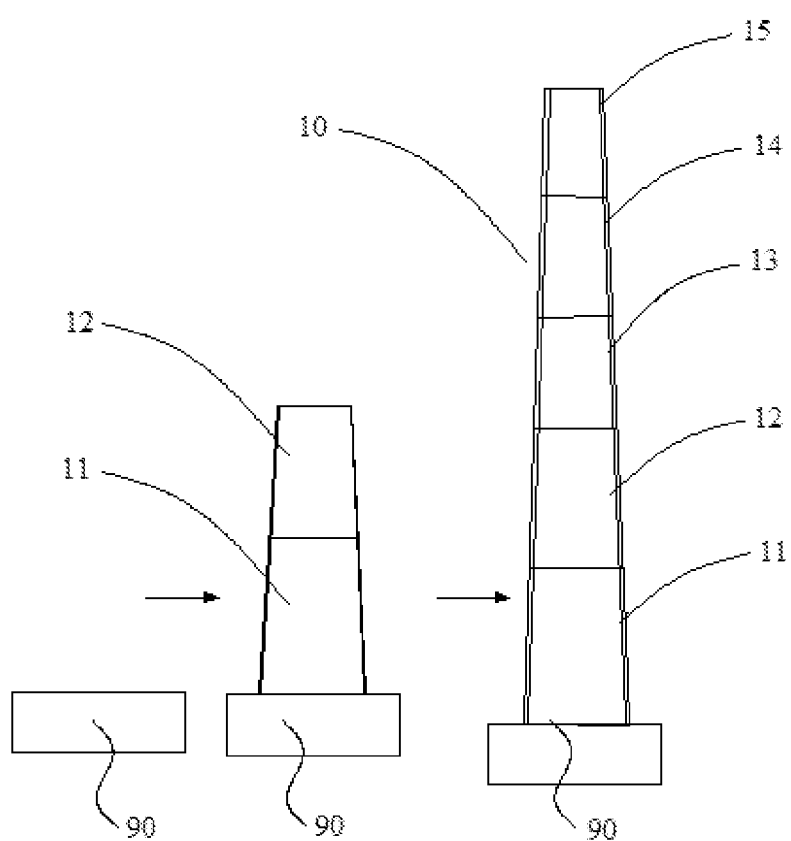
Figure 2:
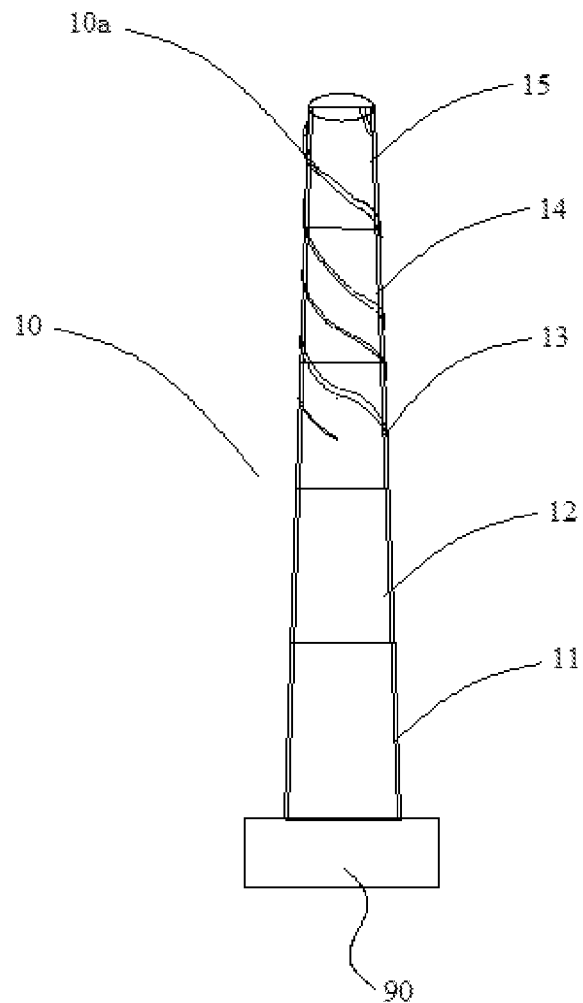
Figures 1, 3:
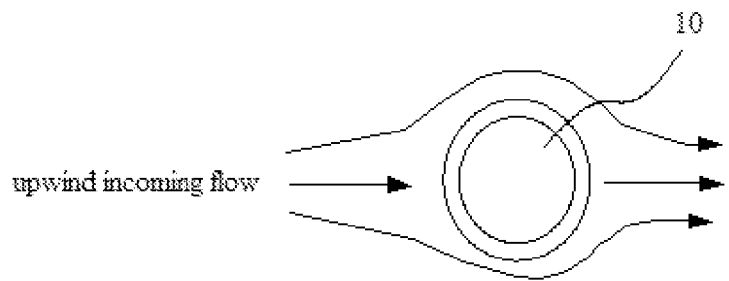
Figures 2, 3:
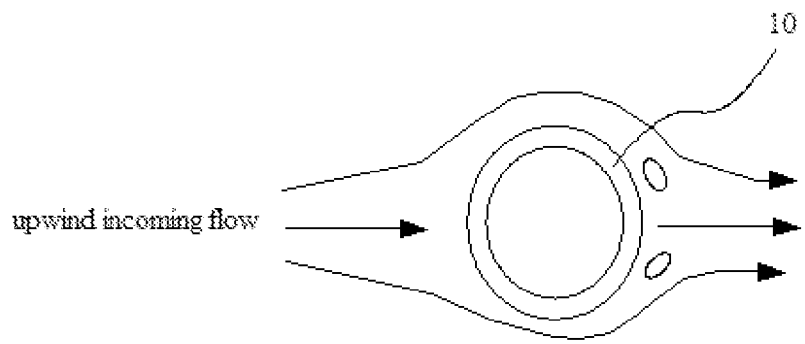
Figure 3:
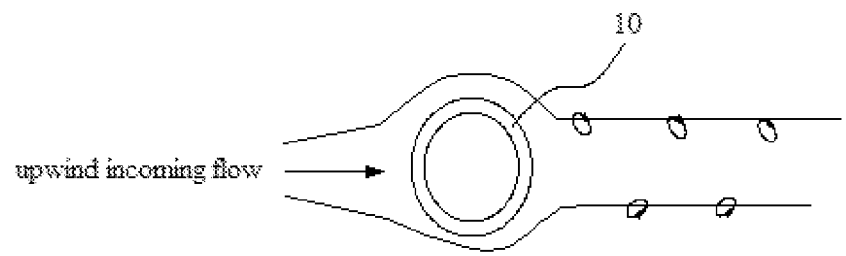
Figures 3, 4:
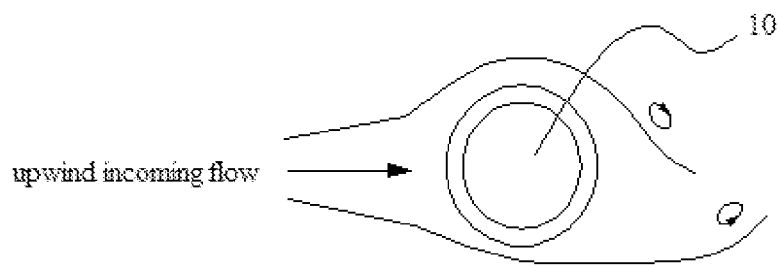
Figures 3, 4, 5:
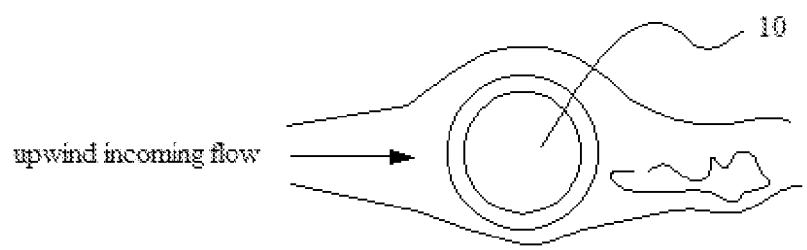

Reference is made to FIG. 4, which is a schematic view showing the structure of a tower surrounded by a floating body according to a specific embodiment of the present application; FIG. 5-1 is a partially enlarged schematic view showing a portion A in FIG. 4; FIG. 5-2 is a top view showing the floating body surrounding the tower in FIG. 4; FIG. 5-3 is a top view showing the floating body in FIG. 4; FIG. 5-4 is a partially enlarged schematic view showing a portion 1 in FIG. 5-3; and FIG. 5-5 is a schematic view showing that the floating body in FIG. 4 swings with the changing of a wind direction of the upwind incoming flow.

As shown in FIG. 4, the tower 100 is installed on a foundation base 300. The tower 100 is formed by five tower sections connected from bottom to top in sequence, the five tower sections are respectively a first tower section 101, a second tower section 102, a third tower section 103, a fourth tower section 104, and a fifth tower section 105 shown in the figure. It can be understood that, the sections of the tower 100 are not limited to five sections.

A floating body 200 is sleeved on the tower 100. As shown in FIG. 4, the floating body 200 surrounds the fourth tower section 104 of the tower 100. Referring to FIG. 5-2, the floating body 200 is in the shape of a complete ring, and has a through-hole 207 in the middle, so that the floating body 200 can surround the tower 100 and accommodate the tower 100.

The floating body 200 according to the present application means that the floating body 200 can float in the air without falling down. There are many ways to realize this. For example, the floating body 200 in this embodiment is specifically in the shape of a "fish", as shown in FIG. 5-2, the floating body 200 is a bionic structure, a left end thereof is a front edge 201 of the floating body 200, corresponding to the position of a "fish mouth", and a right end is a tail portion 202 of the floating body 200, corresponding to a "fish tail". When the floating body 200 is in the shape of the streamlined fish, according to floating principle, the floating body 200 of this structure can automatically float up in the air under the effect of an upwind incoming flow, and even if the wind is small, the floating body 200 can also float up, which is similar to the principle of a fish floating in the water. For another example, an interior of the floating body 200 may also be directly filled with a gas having a density smaller than that of air, which can also achieve floating. Moreover, the floating body 200 can not only be filled with a low-density gas but also be designed to have a streamlined shape.

In this embodiment, an excitation device is further provided to excite the floating body 200 to float up and down. The excitation device specifically includes a tether 600 connected to the floating body 200 to prevent the floating body 200 from falling off from the tower 100. In FIG. 4, one end of the tether 600 is connected to the floating body 200, and the other end of the tether is connected to a rope actuator 706 (which may be described in detail hereinafter). As described above, the floating body 200 can float in the air, and when a wind force is constant, the floating body 200 is substantially at a same height; when the wind force changes, the floating height of the floating body 200 changes in a certain degree. The excitation device described herein is used to urge the floating body 200 to rise and fall, i.e., to move up and down within a certain range.

Figure 10:
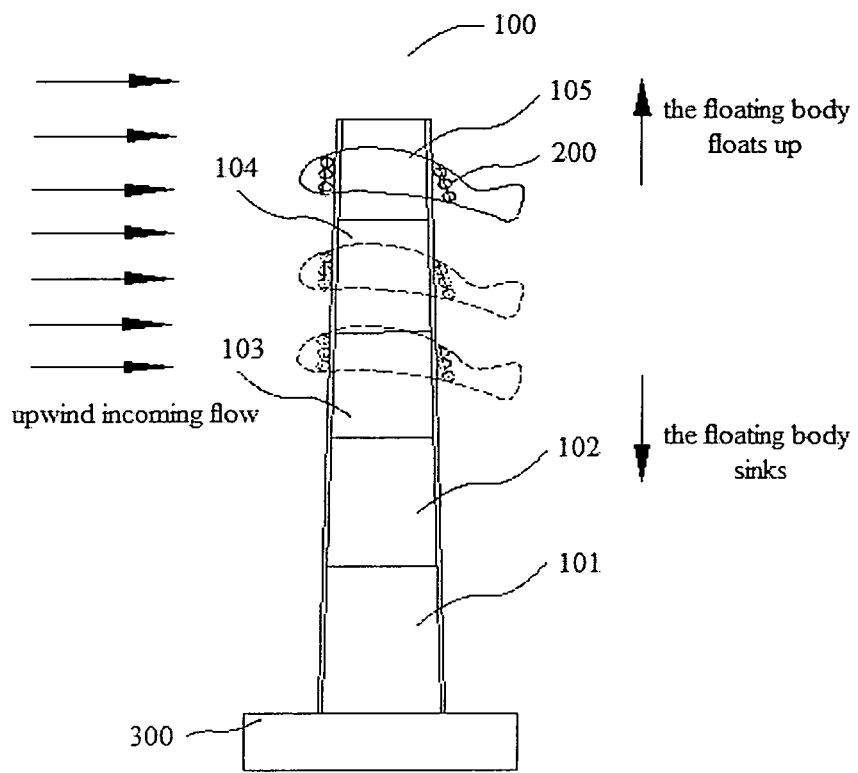
FIG. 10 is a schematic view showing the floating body in FIG. 4 floating up or down.
Figure 11:
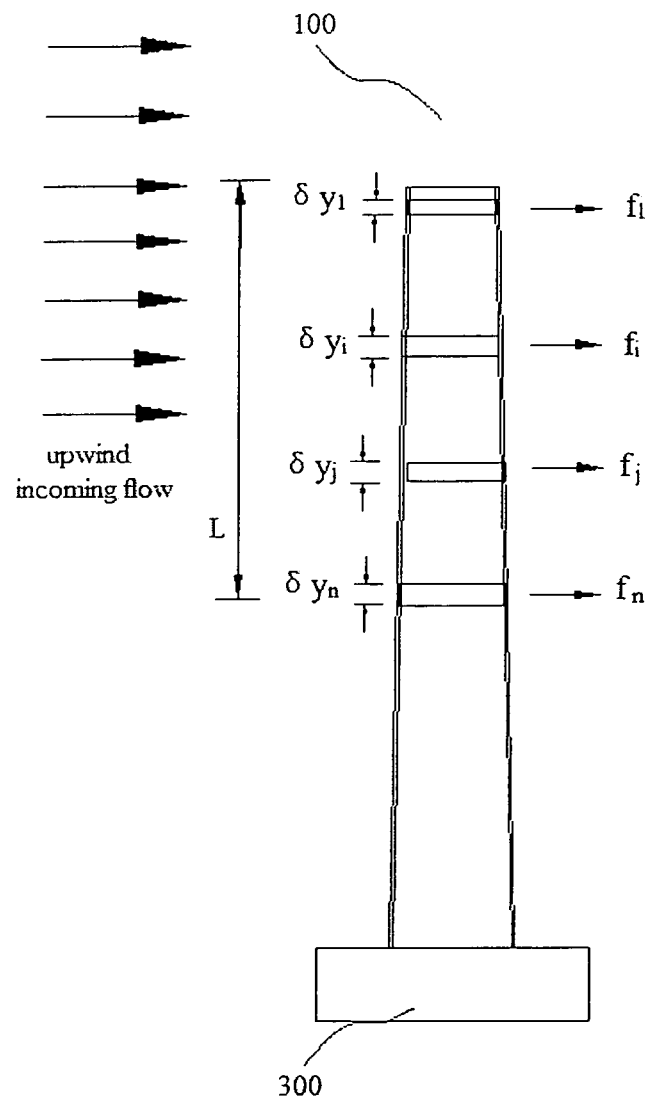
FIG. 11 is a schematic view showing a total fluctuating wind force formed by the upwind incoming flow flowing around the tower being weakened when the floating body floats up and down.

In this embodiment, the excitation device excites the floating body 200 to float in up and down directions of the tower 100. As shown in FIGS. 10 and 11, FIG. 10 is a schematic view showing that the floating body in FIG. 4 floats up or down; and FIG. 11 is a schematic view showing a total fluctuating wind force formed by the upwind incoming flow flowing around the tower weakened when the floating body floats up and down.

In this embodiment, the tower 100 is surrounded by only one floating body 200, which may float up to the fifth tower section 105, or may also float down to the third tower section 103 shown in FIG. 10. Of course, the drawings are exemplary descriptions, and a specific floating height region is not limited thereto.

It can be known that, after the floating body 200 is designed in a shape capable of floating, the floating body 200 can float up or down regularly or irregularly, which is equivalent to moving up and down in a height direction of the tower 100 (at least in an upper portion of the tower 100). The movement is similar to sweeping up and down with a "brush", which constantly changes an attack angle and an aerodynamic configuration of the tower sections at different heights.

In addition, when coming into contact with the front edge 201 of the floating body 200, the upwind incoming flow is divided into at least four parts due to the streamlined design: a part of the airflow is inclined upward after passing through the front edge 201 of the floating body 200, a part of the airflow is inclined downward after passing through the front edge 201 of the floating body 200, and a part of the airflow is separated left and right and flows to both sides of the floating body 200.

Obviously, when the part of the airflow of the upward incoming flow is inclined upward, a positive attack angle is formed, and the part downwardly inclined forms a negative attack angle.

During the illustration of a specific principle of the above floating body 200 capable of suppressing the vibration of the tower 100, technical terms such as "attack angle", "aerodynamic configuration" and the like are involved, which may be illustrated hereinafter.

Figures 3, 4, 5, 6:
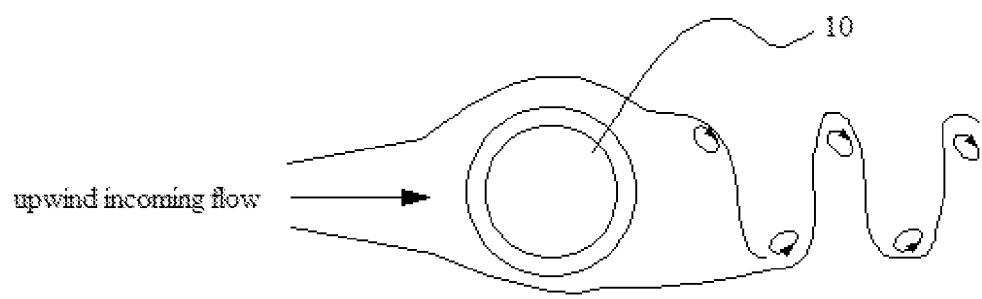
Figure 4:
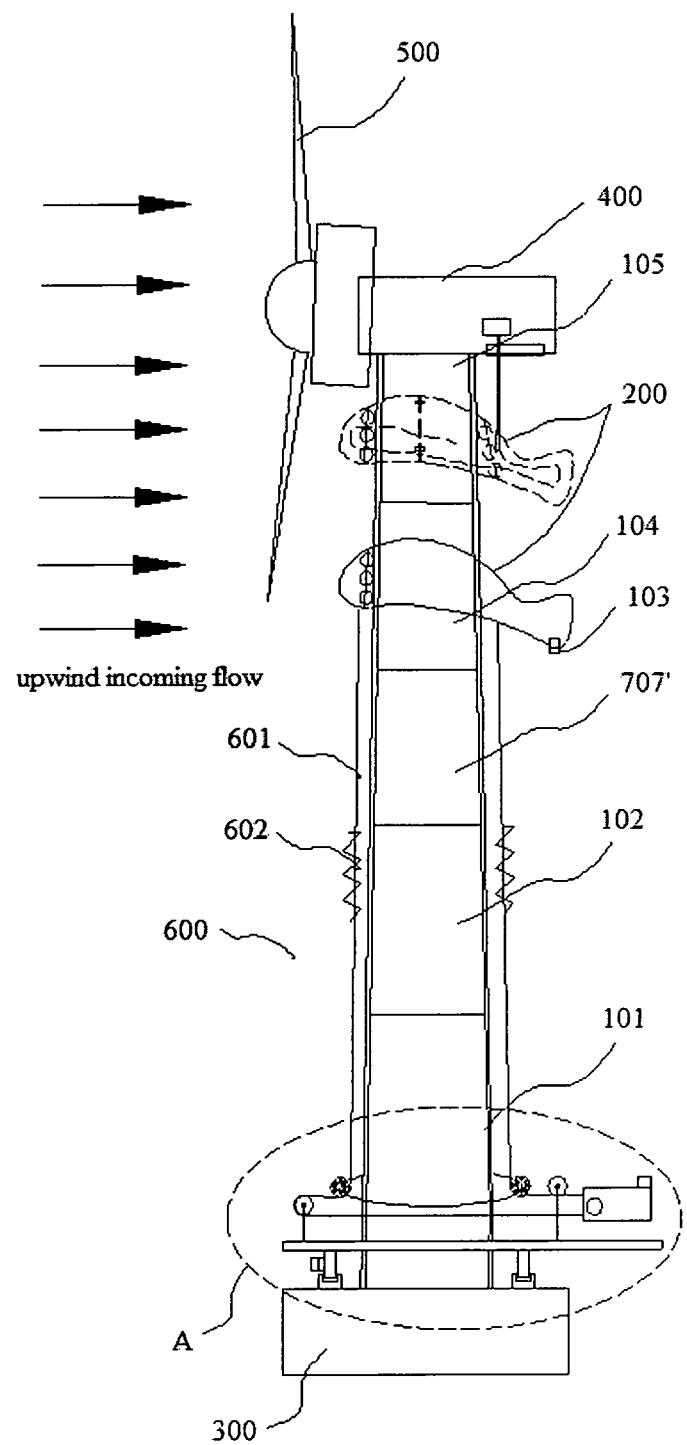
Figures 1, 5:
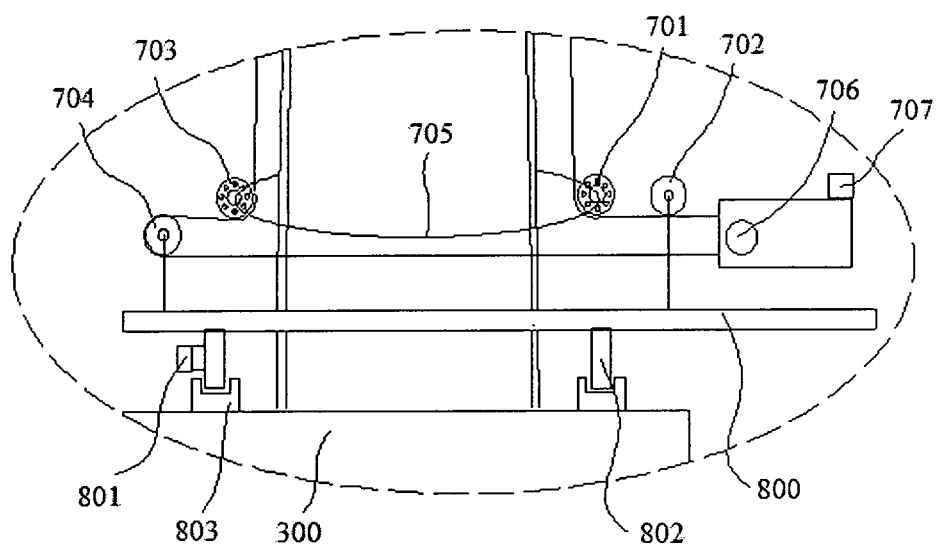
Figures 2, 5:
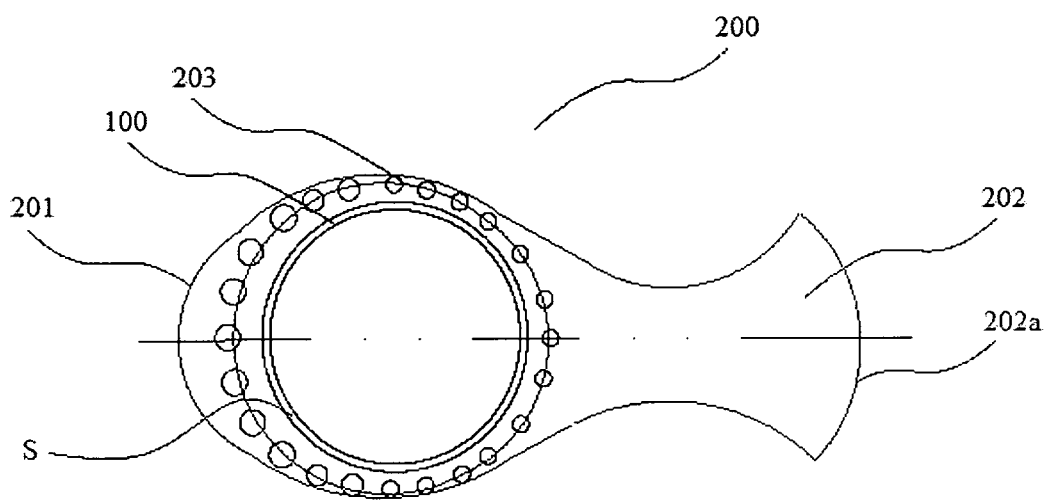
Figures 3, 5:
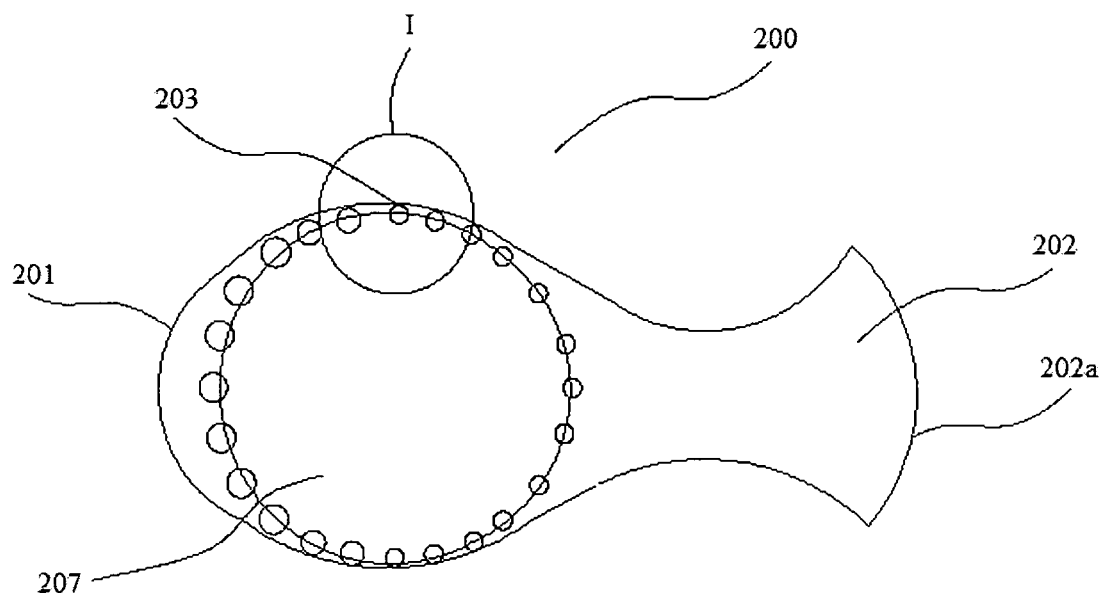
Figures 4, 5:
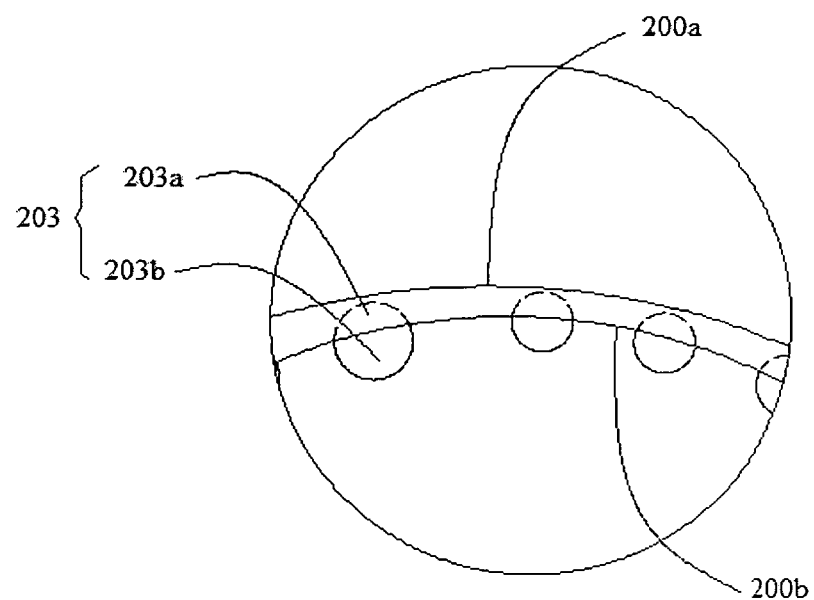
Figure 5:
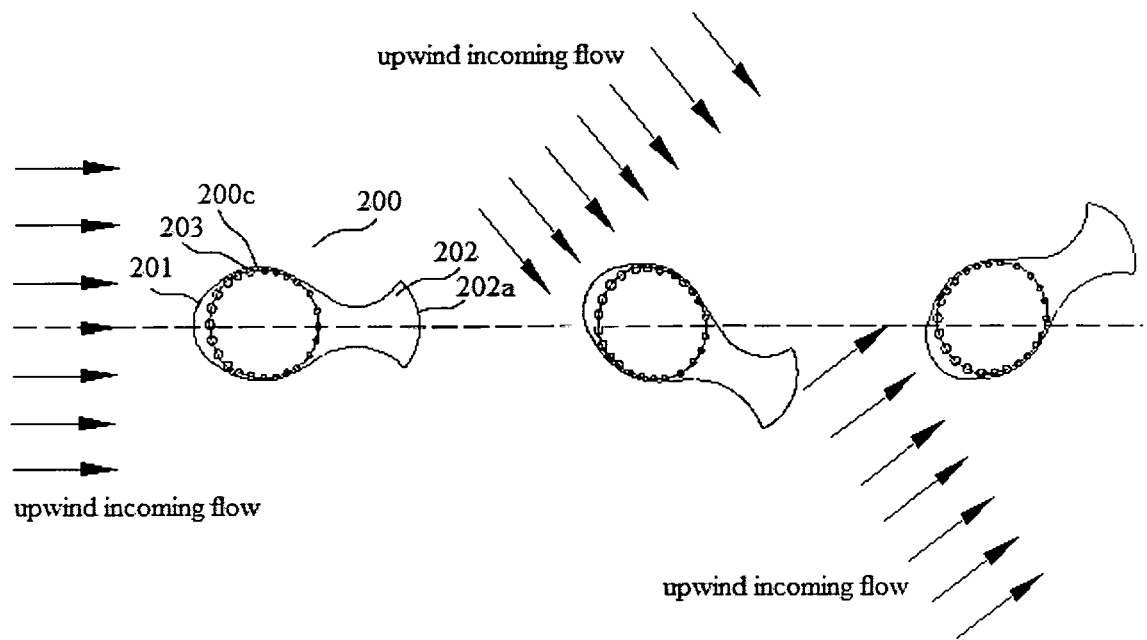
Figure 6:
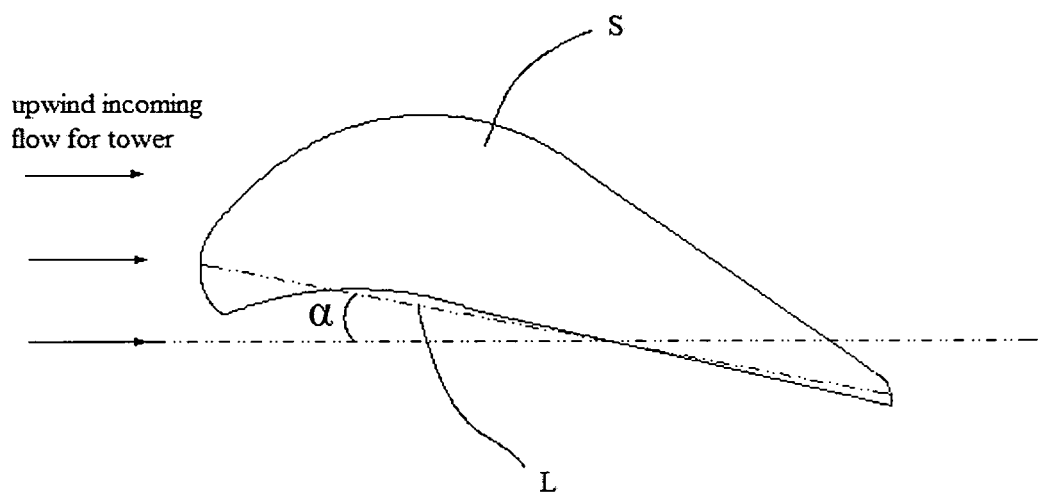
Figure 7:
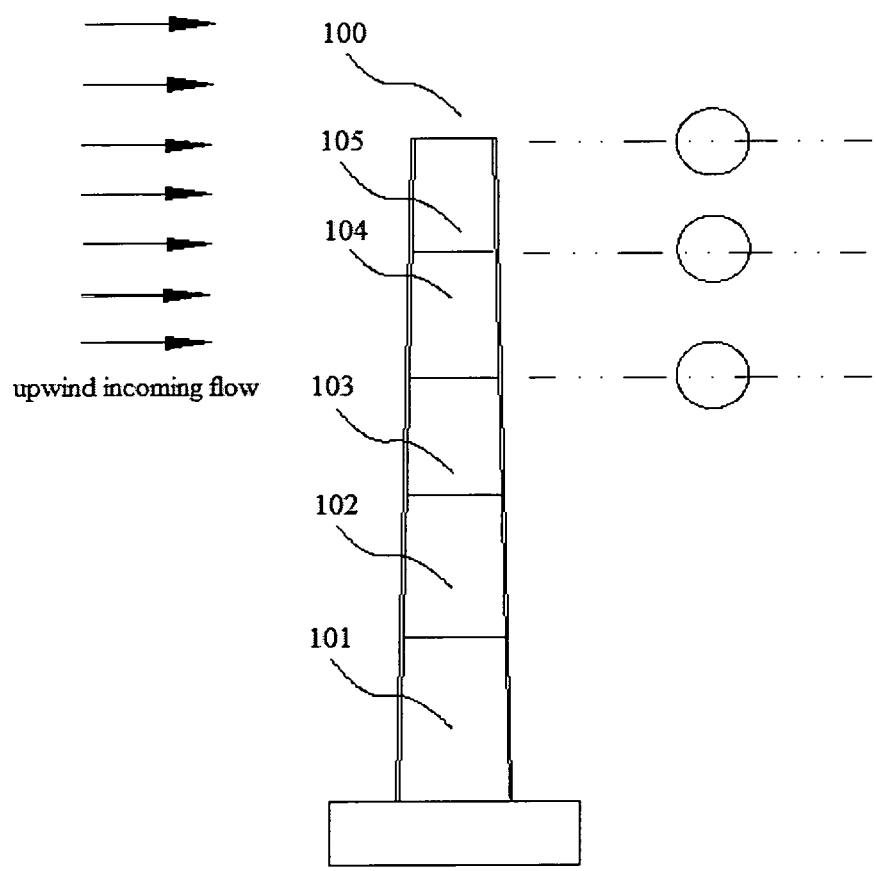
FIG. 7 is a schematic view showing an aerodynamic configuration when the tower 100 is not surrounded by the floating body 200.
Figure 8:
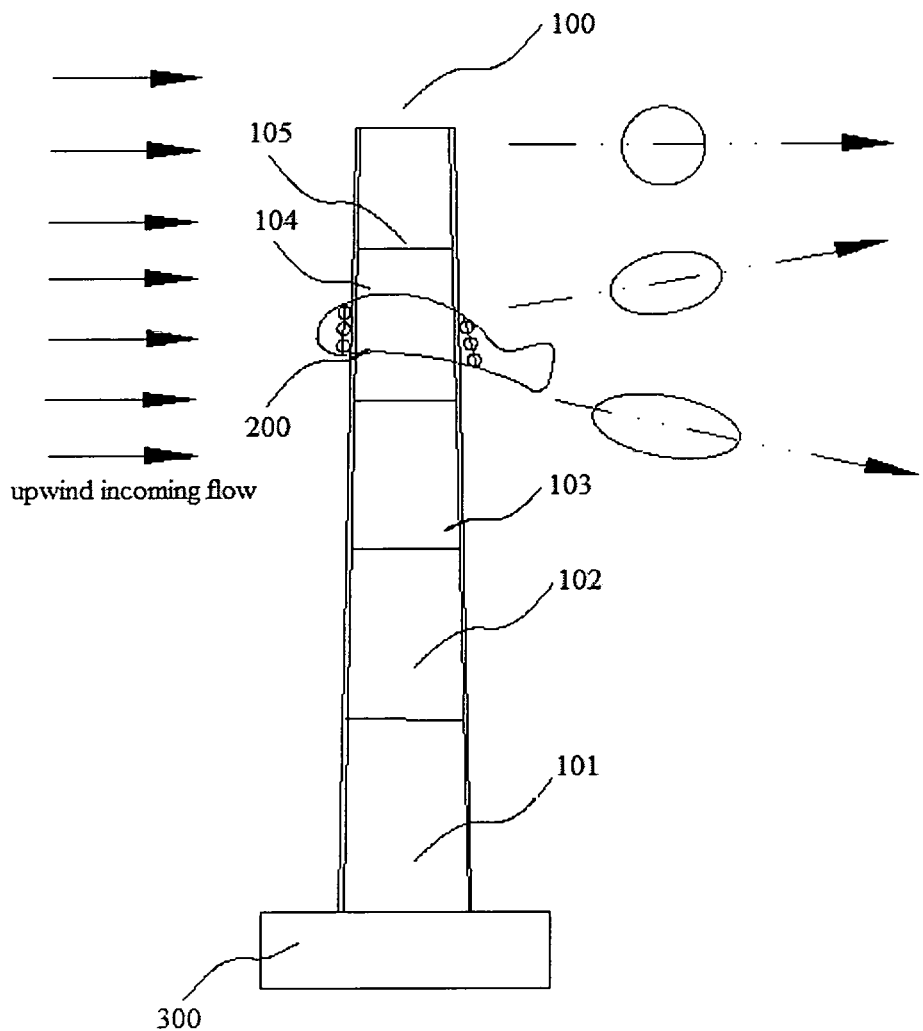
FIG. 8 is a schematic perspective view showing changes of the attack angle and the aerodynamic configuration in case of the upwind incoming flow in FIG. 4.
Figure 9:
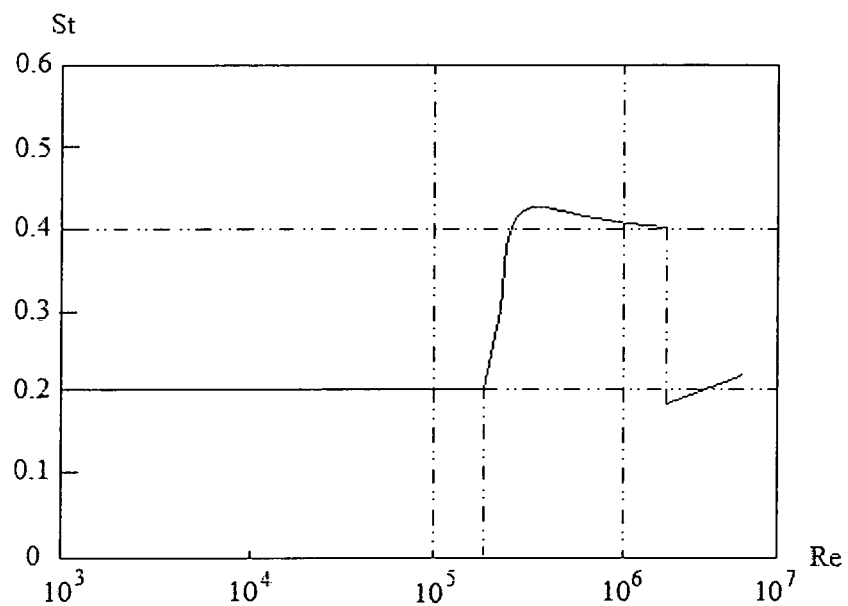
FIG. 9 is a schematic view showing the relationship between Strouhal Number and Reynolds number on an outer surface of the tower.

The specific principle can refer to FIGS. 6 to 8, FIG. 6 is a schematic view showing a wing-shaped attack angle; FIG. 7 is a schematic view showing an aerodynamic configuration when the tower 100 is not surrounded by the floating body 200; and FIG. 8 is a schematic perspective view showing changes of the attack angle and the aerodynamic configuration in case of the upwind incoming flow in FIG. 4.

The attack angle, sometimes also called as incidence angle, is a hydromechanics term. For a wing-shaped section S, the attack angle α is defined as an included angle between a wing chord L and a speed of the upwind incoming flow, the attack angle is positive when the airflow is inclined upward and the attack angle is negative when the airflow is inclined downward. As shown in FIG. 8, at the position where the floating body 200 is arranged, the airflow inclined upwardly after passing through the front edge 201 of the floating body 200 forms a positive attack angle (an included angle between the airflow and a left and right horizontal direction), and the airflow inclined downwardly after passing through the front edge 201 of the floating body 200 forms a negative attack angle, and correspondingly, the tower 100 forms an oval aerodynamic configuration.

The aerodynamic configuration refers to a configuration suitable for movement in a gaseous medium employed by an object moving in the gaseous medium in order to reduce the moving resistance. The aerodynamic configuration is a concept mainly proposed for air vehicles such as a missile, an aircraft and the like, and is applied to the tower 100 according to the present application. The aerodynamic configuration specifically refers to a function value formed by a lifting force and a resistance acting on the missile and the aircraft in a flying state, and directions and the magnitude thereof, and objective factors which may affect the flying of the air vehicle, such as a cross-section, a length, the thrust, the stability of the air vehicle. The configuration of the air vehicle is determined by the function value.

When the direction of the upwind incoming flow changes, the aerodynamic configuration change accordingly. In a case that the upwind incoming flow is horizontal, the aerodynamic configuration is circular-shaped. As shown in FIG. 7, in a case that the upwind incoming flow comes into contact with the tower 100 horizontally, the aerodynamic configurations are all circular-shaped, which are blunt bodies. In FIG. 8, a position of the fifth tower section 105 is not provided with the floating body 200, and the aerodynamic configuration is also circular-shaped (that is, a cross-sectional shape of the tower 100). When the airflow is inclined upward or downward, the aerodynamic configurations may be oval-shaped. The change of the aerodynamic configuration of the tower 100 caused by the streamlined shape of the floating body 200 also varies. As shown in FIG. 8, an oval-shaped aerodynamic configuration in a middle portion has a small attack angle; compared with the oval-shaped aerodynamic configuration in the middle portion, an oval-shaped aerodynamic configuration in a lower portion has a greater ratio of the long axis to the short axis, and has a relatively large attack angle, and is more streamlined.

It should be understood that, for the tower 100 immersed in the fluid, airflow vortices are generated when the fluid (such as the airflow in a wind power plant) flows by or sweeps across an outer surface of the tower 100, due to an unbalanced force caused by the airflow vortices alternately shedding from both sides of the tower 100 (which is a blunt body) to leave a surface of the tower 100, a lateral force pointing to the side of tower is generated at positions where the airflow vortices shed at both sides of the tower 100. The tower 100 is made to perform a forced vibration in a cross-wind direction (a lower portion of the tower 100 is being dragged by an upper portion and a middle portion of the tower 100) which is similar to simple harmonic vibration (i.e. sinusoidal) by the alternately shedding vortices in this way, which is called a vortex-induced resonance. That is, the vortex-induced resonance caused by the vibration induced by the Karman vortex street phenomenon mentioned in the background.

When the tower 100 generates a vortex-induced resonance, a vortex-induced force (that is, the unbalanced force) acting on the outer surface of the tower 100 is approximately a harmonic force F(t):

$$F(t) = F_0 \sin \omega t \qquad (1)$$

where, ω(Re,St) is a frequency of vortex shedding, and ωt as a whole is a variable;

Re is Reynolds number, St is Strouhal number, $F_0$ is an amplitude value of the vortex-induced force, $F_0 = (\rho U^2/2)CD$;

ρ is the density of the upwind incoming flow for the tower 100;

U is a wind speed of the upwind incoming flow for the tower 100;

C is an aerodynamic coefficient of a section of the tower 100 structure; the aerodynamic coefficient is also called a wind load shape coefficient, which is a ratio of a pressure (or suction) formed by the wind on a surface of an engineering structure to a theoretical wind pressure calculated according to a speed of the incoming flow. The aerodynamic coefficient reflects the distribution of a stable wind pressure on surfaces of the engineering structure and a building and varies with different shape, scale, shielding conditions of the building, airflow direction and the like;

D is a characteristic dimension when the outer surface of the tower 100 structure is swept across by the fluid, and is the characteristic dimension of a spatial structure formed by an obstacle facing the fluid when the fluid passes through the obstacle or flows around the obstacle, which is a general term in the field of heat transfer. In this embodiment, it refers to the characteristic dimension of a contact surface between the enclosure (a shape of the outer surface of the tower herein) and the fluid (the airflow herein), generally a structural width perpendicular to the wind direction is employed, which herein is an outer diameter of the tower 100 at a corresponding height.

The change of a lateral vibration amplitude of the tower 100 caused by the vortex-induced force is:

$$A(t) = \frac{\pi}{\delta} \frac{1}{K} (\rho U^2/2) CD \sin\omega t \qquad (2)$$

where, K is the stiffness of a tower 100 structural system (a nacelle 400 may be included); and δ is a logarithmic decrement (about 0.05).

When the wind speed of the upwind incoming flow reaches a certain appropriate value and continues for a certain period of time, the tower 100 structure may generate the vortex-induced resonance, and in this case the vibration amplitude A is:

$$A = \frac{\pi}{\delta} \frac{\rho C f^2}{2K(St)} D^3 \qquad (3)$$

It can be seen that, when a sectional dimension of the structure is determined, the stiffness K or the damping can be increased to reduce the vibration amplitude of the vortex-induced resonance.

In the above formula, $$St = \frac{fD}{U},$$

which is the Strouhal number. The definition of the Strouhal number describes the relationship between a vortex shedding frequency, the wind speed, and the diameter of a cylindrical body.

Where, f is the vortex shedding frequency (Hz);

U is the wind speed of the upwind incoming flow of the tower 100;

D is the characteristic dimension when the outer surface of the tower 100 is swept across by the fluid.

In this embodiment, D refers to an outer diameter of the tower 100 at different heights. The outer diameter may change. When the upwind incoming flow is non-horizontal, and flows around the tower 100 at a certain inclination, a path of the airflow flowing around a periphery of the tower 100 is approximately oval-shaped, as the aerodynamic configuration described hereinbefore. In this case, the characteristic dimension D is an equivalent diameter (a technical term in heat transfer, which is a diameter of an imaginary circular section, that is, a diameter of the circular section converted by a non-circular section according to an equal circumference) of the oval-shaped aerodynamic configuration. In this case, a boundary that is wetted by the fluid or in contact with the fluid becomes more streamlined, and is less blunt. In view of the vibration form, the vortex-induced resonance is an amplitude-limited vibration with dual features of self-excitation and forcing.

The Strouhal number can be obtained based on the Reynolds number. The relationship between the Strouhal number and the Reynolds number can be referred to FIG. 9, which is schematic view showing the relationship between the Strouhal Number and the Reynolds number of the outer surface of the tower, wherein the horizontal axis indicates the Reynolds number, and the vertical axis indicates the Strouhal number. Before the Reynolds number reaches $2 \times 10^5$, the Strouhal number is a constant of 0.20. Then, as the Reynolds number increases, the Strouhal number first jumps to 0.30, then increases to 0.43; and then, when the Reynolds number is equal to $2 \times 10^6$, the Strouhal number is dropped to 0.2. Therefore, the Strouhal number, D and U are parameters that can be obtained, and f can also be calculated based on the formula of the Strouhal number. Accordingly, the vibration amplitude can also be obtained by calculation.

Accordingly, the principle of the present technical solution that the tower 100 is surrounded by the floating body 200 to achieve the vibration reduction effect is analyzed as follows.

1. When the floating body 200 floats up and down to perform "sweeping", it is equivalent that an airflow boundary layer at an outer wall of the tower 100 is continuously "refreshed", thus the airflow boundary layer at the outer wall of the tower 100 is destroyed. According to the formation principle of the Karmen vortex street vibration described in the background, after the boundary layer is destroyed, the formation of the vortices at two sides of the back of the tower 100 is prevented, which directly suppresses the origin of the vortex-induced vibration.

2. Due to the up and down floating of the floating body 200, when the upwind incoming flow flows around the tower 100 to come into contact with the floating body 200, the aerodynamic configuration is changed, especially after the streamlined front edge 201 is provided, the aerodynamic configuration and the attack angle of the upwind incoming flow are further changed. Then, the aerodynamic coefficient C of the tower 100 with respect to the streamlined bypassing airflow is smaller, it can be understood that the resistance is reduced, and thus the vibration amplitude A of the vortex-induced resonance can also be reduced, thereby reducing the vibration.

Quantitative analysis may be further performed. When the aerodynamic configuration becomes oval, the aerodynamic coefficient C can be reduced from an usual value of 1.2 to about 0.6 or even smaller (for example 0.5), thus the resistance can be greatly reduced, thereby the vibration can be reduced. It can be understood vividly that, when the upwind incoming flow sweeps across the tower 100 horizontally, the aerodynamic configuration in contact with the outer surface of the tower is circular, which belongs to a blunt body. A wind direction is required to be changed suddenly, which may cause a great unbalanced force. However, after the attack angle changes, the aerodynamic configuration is oval, a backward (that is, downwind direction) moving track of the fluid (that is, the airflow) along the surface of the tower 100 is elongated, a contact angle between the fluid and the outer wall of the tower 100 changes, and since the airflow rises, the contact angle becomes smaller, and changes slowly according to the wind direction, it is beneficial to suppress the occurrence of the bypassing flow shedding of the airflow around the outer wall of the tower 100, so as to suppress the generation of crosswind unbalanced force of the tower 100, and to reduce the vibration caused by the unbalanced force in a coupling process of the airflow and the outer wall of the tower 100.

3. The up and down floating of the floating body not only destroys the airflow boundary layer on the outer wall of the tower 100, but also disrupts both upper and lower sections of a nearby flow field actually, thus disrupting the correlation of the upwind airflow close to the floating body 200. Of course, when the floating body 200 is designed to be streamlined as described above, after the upwind incoming flow passes through the floating body 200, at positions corresponding to the floating body 200, the direction and the path of the airflow may change, which also disrupts the correlation of the upwind airflow close to the floating body 200. After the correlation of the upwind airflow being disturbed, the consistency of the airflow vortex shedding frequency between the floating body 200 and other positions is disrupted correspondingly, thus weakening a combined action thereof, reducing or preventing the vortex-induced response of the bypassing flow shedding of the boundary layer on the outer wall of the tower 100, thereby preventing the vortex induced vibration of the tower 100.

The correlation is an important feature of a fluctuating wind, and is related to fluctuating wind speeds at two spatial points or fluctuating pressures at two points at different heights of the surface of the tower 100.

a correlation coefficient ρ is defined as $$\rho = \frac{\overline{u'(Z_1)u'(Z_2)}}{\sigma_u(Z_1)\sigma_u(Z_2)}.$$

At two different heights ($Z_1$, $Z_2$), a covariance of the fluctuating wind speed is defined as follows:

$$\overline{u'(Z_1)u'(Z_2)} = \frac{1}{T}\int_0^r [U(Z_1, t) - \overline{U}(Z_1)][U(Z_2, t) - \overline{U}(Z_2)]dt$$

Therefore, the covariance is a time average of a product of the fluctuating wind speeds at the two heights. Both the wind speed values on a right side of the equation are subtracted with respective average values $\overline{U}(Z_1)$ and $\overline{U}(Z_2)$.

In mathematics, the formula of a standard deviation can be expressed as:

$$\sigma_u = \left\{\frac{1}{T}\int_0^T [U(t) - \overline{U}(Z)]dt\right\}^{\frac{1}{2}}$$

Wherein, U(t) is a wind speed component in a direction of an average wind speed, which equals to $\overline{U}(Z)$+u(t);

u(t) is a downwind turbulent component, i.e., a fluctuating wind speed component in the direction of the average wind speed.

The numerator indicates covariance of fluctuating wind speeds, and the wind speeds are different at two different height of the tower 100.

The covariance is a time average of a product of the fluctuating wind speeds at two heights.

An overall intensity of turbulence can be measured by the standard deviation of wind speed or root mean square, an average component is subtracted from the wind speed, then the deviation is used to quantify a remaining part, the deviation after being squared is averaged, and finally a root is extracted to obtain a physical quantity having a unit of the wind speed, thus the standard deviation is obtained. According to the definition formula of the correlation coefficient, the correlation coefficient between two wind speeds at different heights is obtained by the covariance of wind speeds at different heights being divided by the standard deviation. A smaller correlation is better, which hinders the frequencies of vortices at different heights after vortices formation and breaks the convergence and growth of the vortex-induced resonance energy caused by the frequency consistency, i.e., preventing the growth of the vortex-induced resonance, and even making the vortex-induced resonance to disappear.

To build wind power plants in high altitude regions of southern China such as Yunnan, Guizhou, and Sichuan, roads are required to be built around high mountains. In addition, a hoisting period is usually longer on high mountains, the uncertainty of the wind may affect the hoisting construction at any time. The hoisting cost is 270000-320000 yuan per unit, once the hoisting has a problem, there may be huge loss. The inventors of the present application conducted field researches on the construction of wind power plants in high altitude and high mountains regions, and proposed the solution of the floating body 200, so that an on-site hoisting progress and installation period may not be limited by the wind conditions in local regions any more. The arrangement of the floating body 200 can ensure or bid for a reliable hoisting of the nacelle 400 when the wind speed is less than 8 m/s and the hoisting of the tower 100 when the wind speed is less than 10 m/s. Under the above two wind speed conditions, the existing hoisting methods may not work normally. This solution can improve the safety and hoisting efficiency in a limited hoisting time, reduce the waste caused by the delay of the wind power plant construction period and the delay of grid-connected power generation of the wind turbine generator system due to wind uncertainties, and can also reduce the damage and hidden dangers to base connecting pieces of the tower 100 caused by the wind-induced vibration of the tower 100 serving as a load-bearing structure of the wind turbine generator system in the hoisting process. Also, this solution can reduce the construction cost, and assist investors in achieving grid-connected power generation as soon as possible and obtaining benefits as soon as possible.

Besides, in this embodiment, the floating body 200 is designed in a fish shape, and actually a purpose of floating under the action of the upwind incoming flow is further realized. According to the principle of fluid mechanics, the floatable floating body 200 can be designed in other shapes to meet the purpose, such as an airplane wing. In this embodiment, a fish-shaped bionic structure is employed (most of the fishes in the sea can realize floating in the fluid due to their body shapes, such as cuttlefishes), and the floating mainly depends on a buoyancy force generated by a pressure difference between an upper surface and a lower surface of the floating body.

Figure 12:
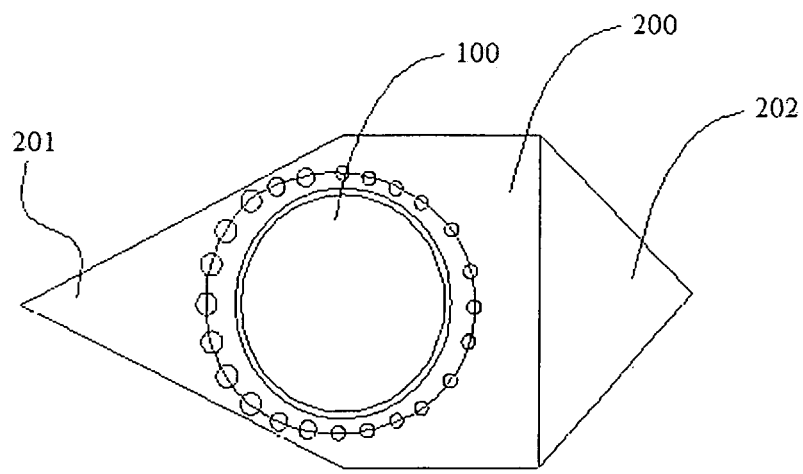
FIG. 12 is a schematic view showing the structure of another floating body.

As shown in FIG. 12, which is a schematic view showing the structure of another floating body 200 viewed from the top. The floating body 200 has a streamlined front edge 201 and a tail portion 202, and the floating body 200 of this structure can also achieve floating. As viewed from the top, the front edge 201 of the floating body 200 is relatively pointed, and is gradually extended and widened to two sides, and then the width is less changed, and finally narrowed at the tail portion 202. The tail portion 202 is relatively short, which is similar to an air vehicle.

Referring to FIG. 11, when the vibration is generated at an upper portion of the tower 100 (in this case, the upper end of the tower 100 is a free end and a lower end of the tower 100 is fixed, the vortex street releasing causes unbalanced crosswind forces, and these forces have long arms with respect to the fixed end on a base fixing end of the tower 100), a vibration moment is the largest and the damage is strong. Therefore, the floating body 200 is arranged on the upper portion of the tower 100 to float up and down within a height region L shown in the figure. When the floating body 200 is located at $\delta y_1$, the airflow corresponds to a position $f_1$, parts above and under the position $f_1$ is disturbed by the floating body 200. When the floating body 200 floats down to $\delta y_i$, the airflow at a position fi is disturbed, and positions $\delta y_j$ and $\delta y_n$ are sequentially inferred. While the positions are disturbed, along a vertical height direction of the outer wall of the tower 100, the consistency (properties of the unbalanced crosswind forces, having the same direction and the same frequency) of unbalanced crosswind forces caused by vortex street releasing at upper and lower sections are destroyed or broken, then the total fluctuating wind force (a value obtained by summing the unbalanced crosswind forces with direction properties) in the height region L is weakened.

Moreover, based on the floating type design of the floating body 200, in a case that only one floating body 200 is provided, the flow around the boundary layer on the outer wall at different heights of the tower 100 can be destroyed to suppress the vortex-induced vibration. Of course, the number of the floating bodies 200 is not limited, in a case that the height of the tower 100 is large and a length of the sections requiring vibration suppression is relatively long, more than two floating bodies 200 may also be provided to float up and down together to destroy the flow around the boundary layer on the outer wall of the tower 100.

It should be noted that, the floating body 200 arranged in a streamline shape can further improve the breaking ability of the boundary layer and suppress the vortex-induced vibration. However, it should be understood that, the floating body 200 may also not be streamlined. According to the vibration suppression principle described above, as long as the floating body 200 floats up and down, the airflow boundary layer can be destroyed, and the aerodynamic configuration of part of the upwind incoming flow can be changed to form a positive attack angle or a negative attack angle, and the airflow correlation between the upper and lower sections can be broken, thus suppressing the vibration. For example, the floating body 200 may be an ordinary annulus structure. Of course, in order to better suppress the vortex-induced vibration and achieve better floating, it is also a preferable solution to provide the floating body structure described above.

Compared with the method of employing a spiral wire in the background, in the above manner, besides the influence of vortex-induced vibration is reduced, the floating body 200 floats up and down to destroy the airflow boundary layer and break the correlation between the upper and lower sections, and this function has no specific corresponding relationship with change of the wind speed. When the wind speed changes, the vibration suppression can be achieved through adjusting the floating range and the floating speed, therefore, even if the wind speed changes, the function of vibration suppression can still be ensured. In addition, with the front edge 201 at a side facing the upwind incoming flow of the floating body 200 being designed in the streamline shape, the resistance of the upwind incoming flow can be reduced, and noise is reduced, thereby satisfying the requirements of ecological regulations.

Besides, for the fish-shaped floating body 200, in addition to making the upwind incoming flow to form positive and negative attack angles, a path of the upwind incoming flow flowing backward from two sides of the floating body 200 is also elongated, this is because that actually the aerodynamic configuration corresponding to the part of the airflow is approximately oval, that is, this part of airflow flows backward from the two sides of the floating body 200, which is equivalent to flowing along a "fish body". The aerodynamic coefficient C of this part of airflow is also reduced, which is consistent with the above vibration attenuation principle 2 and can also suppress vortex-induced vibration.

Referring to FIG. 4, specifically, in this embodiment, the excitation device includes a rope actuator 706, one end of the tether 600 is connected to the rope actuator, and the other end of the tether 600 is connected to the floating body 200. The rope actuator 706 controls the extension and retraction of the tether 600. The rope actuator 706 may specifically include a winch (not shown in FIG. 5) and a servo motor, one end of the tether 600 is wound around the winch, and the servo motor can control the winch to rotate forward or reversely, so as to control the extension and retraction of the tether 600.

With this arrangement, on the one hand the floating body 200 can be prevented from falling off the top of the tower 100 to leave the tower 100 when the speed of gust is overlarge. More importantly, when the rope actuator 706 drives the tether 600 to extend and retract, a length of extension or retraction of the tether 600 can be better controlled, and accordingly a range within which the floating body 200 floats up and down can be controlled. That is, the up and down floating of the floating body 200 can be controlled, therefore, the range and the floating speed of the up and down floating can be controlled according to the vibration suppression requirements, so that the vibration can be better suppressed.

In order to further improve the reliability of the up and down floating of the floating body 200 and keep balance, two or more tethers 600 may be provided. The above fish-shaped floating body 200 is provided as an example, the front edge 201 and the tail portion 202 thereof may each be provided with the tether 600. Of course, the tether 600 may be provided only at one end, or may also be provided at multiple positions including two sides of the floating body 200.

Referring to FIGS. 4 and 5-1, the excitation device further includes a pulley, the tether 600 is connected to the rope actuator 706 via the pulley, and the pulley keeps the tether 600 to pull the floating body 200 substantially in a vertical direction. When the rope actuator 706 is arranged, a certain distance is inevitably kept between the rope actuator 706 and the tower 100, and the tether 600 stretched out from the rope actuator 706 may be in a non-vertical state, in this case, a lateral force is easily generated when the floating body 200 is pulled. In the present application, the direction of the tether 600 is changed by the pulley so that the pulley can pull the floating body substantially in the vertical direction, thereby the up and down floating of the floating body 200 can be effectively maintained, and the mutual interference and twisting that may occur to multiple tethers 600 can also be prevented.

The excitation device may include one rope actuator 706, and two or more tethers 600 are controlled by the same rope actuator 706 to extend and retract. In this case, each of the tethers 600 enters the same rope actuator 706 after passing through the respective pulley. This arrangement can not only simplify the device, but also easily ensure that a retracted length of each of the tethers 600 is equivalent when the tethers 600 are driven by the same rope actuator 706 to extend and contract, thereby ensuring that the floating body 200 can float up and down stably.

Specifically, as shown in FIG. 5-1, two tethers 600 are provided in total, and each of the pulleys corresponding to the tethers 600 includes a guide pulley and a height-limiting pulley. FIG. 5-1 shows a first guide pulley 701 and a first height-limiting pulley 702 corresponding to a right side tether 600, and a second guide pulley 703 and a second height-limiting pulley 704 corresponding to a left side tether 600.

An outer side (a side away from the tower 100) of each of the tethers 600 is wound around the guiding pulley, then a direction of each of the tethers is changed to be parallel with a direction of the extension and retraction controlled by the rope actuator 706, and each of the tethers is connected to the rope actuator 706 via the height-limiting pulley. The height-limiting pulleys are fixed with respect to the tower 100 (specifically is fixed on the follow-up system supporting and rotating platform 800).

The excitation device further includes a rotating ring 705, which runs through each of the guiding pulleys, and the rotating ring 705 now functions as an axle of all the guiding pulleys. As shown in FIG. 5-1, the rotating ring 705 runs through the first guide pulley 701 and the second guide pulley 703.

As described above, to keep balance, two or more tethers 600 are provided and the tethers 600 are necessarily located at different positions. When the tethers 600 located at different positions are driven by the same rope actuator 706, the tethers 600 depend on the guiding of the guide pulleys. In this application, the height-limiting pulleys are also provided. As shown in FIG. 5-1, the rotating ring 705 runs through the guide pulleys and is not limited by other components. An inner side of the right side tether 600 is wound around the first guiding pulley 701, the right side tether 600 is turned to be horizontal and then enters into the rope actuator 706 via the first height-limiting pulley 702. An inner side of the left side tether 600 is wound around the second guide pulley 703, the left side tether 600 is turned to be horizontal, and then surrounds the second height-limiting pulley 704 to complete a direction change of 180 degrees, and enters into the rope actuator 706 horizontally.

It can be seen that, in the case of simply changing the direction, it is feasible that only the first guide pulley 701 and the second guide pulley 703 may be provided (the tether 600 is changed to surround with the inner side). In this case, both the first guide pulley 701 and the second guide pulley 703 are fixed with respect to the tower 100. In a case that the height-limiting pulleys are arranged herein, the two guide pulleys are not required to be fixed. As can be seen from FIG. 5-1, the guide pulleys and the rotating ring 705 are in a floating state with respect to each other (the height is limited by the height-limiting pulleys). Since the wind direction often changes, when the floating body 200 rotates in a circumferential direction under the wind direction to pull the tethers 200 to twist, the rotating ring 705 and the two guide pulleys can be allowed to deflect slightly to avoid the abrasion between the guide pulleys and the tethers 600.

As a preferable solution, each of the guide pulleys may be a bearing, that is, the tether 600 is wound around an outer ring of the bearing, thereby reducing the abrasion of the guide pulley during the extension and retraction of the tether 600.

As shown in FIG. 5-1, the excitation device further includes a follow-up system supporting and rotating platform 800 on which the rope actuator 706 is arranged, the follow-up system supporting and rotating platform 800 is supported on the foundation base 300 or the tower 100. In this embodiment, the excitation device further includes a track 803 arranged on the foundation base 300 or the tower 100, and a driving motor 801 used to drive the follow-up system supporting and rotating platform 800 to move along the track 803. A bottom of the follow-up system supporting and rotating platform 800 is provided with rolling wheels moving along the track 803. The follow-up system supporting and rotating platform 800 rotates around the tower 100 when moving along the track 803. The power supply of the driving motor 801 and the servo motor of the rope actuator 706 may both be batteries, thus facilitating obtaining the power.

As described above, the floating body 200 may rotate in the circumferential direction to a certain degree (in the following embodiment, when the wind direction changes, the floating body 200 can also automatically rotate to align the front edge 201 with the upwind incoming flow). In this case, for the tethers 600 to better pull the floating body 200, the follow-up system supporting and rotating platform 800 can be controlled to rotate by a corresponding angle, so that the tethers 600 can move together with the floating body 200 and maintain a stable relative relationship with the floating body 200, which facilitates the effective control of the up and down floating, thereby the above objects of destroying the boundary layer, changing the aerodynamic configuration and the attack angle, and breaking the upper-lower correlation are fully achieved.

The follow-up system supporting and rotating platform 800 may be provided with a balance weight (not shown in the figure). The balance weight can increase a weight of the follow-up system supporting and rotating platform 800, to prevent the floating body 200 from driving the tethers 600 to upwardly pull the follow-up system supporting and rotating platform 800 and to cause the same to disengage from the foundation base 300 accordingly when the wind is too heavy. For the same purpose, in FIG. 5-1, the rolling wheels 802 can be clamped into the track 803 to limit the movement in the vertical direction.

The excitation device further includes a controller. In this case, a case body may be arranged on the follow-up system supporting and rotating platform 800, the controller and the above rope actuator 706 (mainly the servo motor and the winch of the rope actuator 706) may all be arranged in the case body. The controller controls the starting and closing of the rope actuator 706 and/or the driving motor 801, which is equivalent to forming an excitation control system for the following of the tethers and the floating of the floating body, and is supported on the follow-up system supporting and rotating platform 800.

The excitation device may also include a vibration monitoring element for detecting the vibration of the tower 100, and a wind speed sensor for measuring the wind speed where the tower 100 is located. The vibration monitoring element may be closely attached to the inner surface or the outer surface of the tower 100 by a magnetic suction disc. The wind speed sensor may be arranged on the tower 100, for example, may be temporarily fixed on the surface of the tower 100 by magnetic adsorption; or may be arranged at a distance of 5-6 times from the periphery of the tower 100, to reduce the influence on the wind speed and wind direction when the upwind incoming flow flows around the tower 100.

The vibration monitoring element and the wind speed sensor transmit a detected vibration signal and a detected wind speed signal to the controller, the controller controls the rope actuator 706 to start or close according to the vibration signal or the wind speed signal separately, or the rope actuator 706 may also be controlled according to the vibration signal and the wind speed signal together. For example, when the vibration signal indicates the presence of vibration, the rope actuator 706 can be started to control the extension and retraction of the tether 600, so that the floating body 200 can float up and down, meanwhile, the range and the speed of extension or retraction can be controlled according to the strength of vibration. When the tether 600 extends and contracts quickly, the floating body 200 floats up and down (a reciprocating movement) quickly, and the floating range is also large, obviously, the upper and lower correlation can be destroyed in a large range and at a high frequency and the airflow boundary can be disrupted; when the floating body 200 floats slowly and the floating range is small, the upper and lower correlation is destroyed in a small range and at a low frequency.

The wind speed can also reflect the vibration condition to a certain extent. Generally, in a certain wind speed range, vibration is apt to be induced. It is not necessarily that the wind speed is large and the vibration is thus large. For example, in a range of 100 to 120 meters, when the wind speed is small, it may also cause a large lateral vibration, i.e., the vortex-induced vibration. While controlling according to the vibration signal, reference can be made in conjunction with the wind speed signal for mutual verification.

In addition, a height detecting element 707' for detecting a height of the floating body 200 may also be provided. As shown in FIG. 5-1, the height detecting element 707' may be an infrared emitter, and the height at which the floating body 200 is located can be obtained by emitting infrared rays to the ground. A wireless receiver 707 may be provided at the follow-up system supporting and rotating platform 800 for receiving a height signal detected by the height detecting element 707'. In FIG. 5-1, the wireless receiver 707 is also installed at the case body where the rope actuator 706 and the controller are arranged. The received signal is transmitted to the controller, not only the height signal detected by the height detecting element 707', but also signals detected by other detecting elements may be sent to the wireless receiver, so that the controller receives various types of signals.

The controller may control the range of extension or retraction of the tether 600 driven by the rope actuator 600 according to a detected height. Of course, the controller can also determine the length of extension or retraction of the tether 600 based on the servo motor of the rope actuator 706, because the servo motor itself can calculate the length of extension or retraction when the servo motor rotates.

The floating body device further includes a direction detecting element for detecting a direction of the floating body 200. The controller controls the driving motor 801 according to the detected direction of the floating body 200, to make the follow-up system supporting and rotating platform 800 follow the floating body 200 to rotate. In addition to directly detecting the direction of the floating body 200, a wind indicator for detecting the wind direction is further provided. For example, in the following embodiment, the front edge 201 of the floating body 200 can automatically align with the upwind incoming flow, therefore, after the wind direction is obtained, the specific direction of the floating body 200 is also obtained, so that the follow-up system supporting and rotating platform 800 can be controlled to rotate by a corresponding angle, to allow the tether 600 to maintain an original pulling state.

The tether 600 may be an elastic tether, or as shown in FIG. 4, the tether 600 specifically includes a tether body section 601 and a spring section 602, that is, the tether body section 601 and the spring section 602 are arranged in series. In the figure, the spring section 602 is connected between two tether body sections 601 in series. Herein, as long as the spring section 602 and the tether body section 601 are connected in series, the number and position order of the sections are not limited. By providing the spring section 602, when the floating body 200 swings during the up and down floating process, the up and down swing of the floating body 200 may be maintained or strengthened by the spring section 602, thereby improving the ability to suppress the vortex-induced vibration.

It can be seen that, the above excitation device mainly depends on the tether 600 that can change telescopically to make the floating body 200 to actively float up and down. When the spring section 602 is provided or the entire tether 600 is an elastic tether 600, the floating body 200 can float up and down only depending on the change of the wind force. In this case, the elastic section 602 can collect the turbulent fluctuating energy of the upwind incoming flow, so that the floating range can be maintained or increased. Even if a buoyancy force for floating up and down of the floating body 200 does not change any more, the spring section 602 may continue to swing, thereby disturbing the upwind incoming flow up and down, destroying the flow around the boundary layer of the tower 100, and suppressing vortex-induced vibration. That is, the spring section 602 herein is similar to an "amplifying circuit" which has an amplification effect on the floating range of the floating body 200. It can be understood that, even if the rope actuator 706 and the like, which can actively excite the tether 600 to extend and retract to drive the floating body 200 to float, are not provided, the elastic tether 600 can swing continuously under the action of change of the wind force, to excite the floating body 200 to float up and down.

In this embodiment, after the vibration signal is fed back to the controller, the controller controls the tether 600 to reciprocatingly extend and retract by the rope actuator 706 to drive the floating body 200 to float up and down. Since the floating breaks the upper and lower correlation and destroys the airflow boundary layer, the vibration signal may change, that is, the vibration signal may gradually weaken. The controller can perform analysis according to the change of the vibration signal in conjunction with a height at which the floating body 200 is located and a current wind speed, to obtain the range and the speed of the up and down floating which can achieve an optimal vibration attenuation effect when the floating body 200 is at a certain height and under a certain wind speed, that is, to obtain the law of controlling the floating body 200 to float up and down to attenuate vibration, which is equivalent to having a function of automatic optimization. In this way, in the hoisting process of the tower 100 or during the application process after installation, an optimal vibration attenuation solution can be selected according to the actual situation. In addition, this control law can also be applied to the installation and application of other towers.

In FIG. 4, the tether 600 is provided with a spring section. As described above, the number of the spring section is not limited, and there may be one or more spring sections arranged in series. Herein, the length of the spring section 602, the elastic coefficient, and the overall length of the tether 600 can be determined according to the height which the floating body 200 is required to reach, the weight of the floating body 200, the wind force and the like, and an ultimate object is that the tether 600 can prevent the floating body 200 from falling off from the top of the tower 100, and besides the tether 600 does not hinder the floating of the floating body 200, and can swing depending on the spring section 602.

Figure 13:
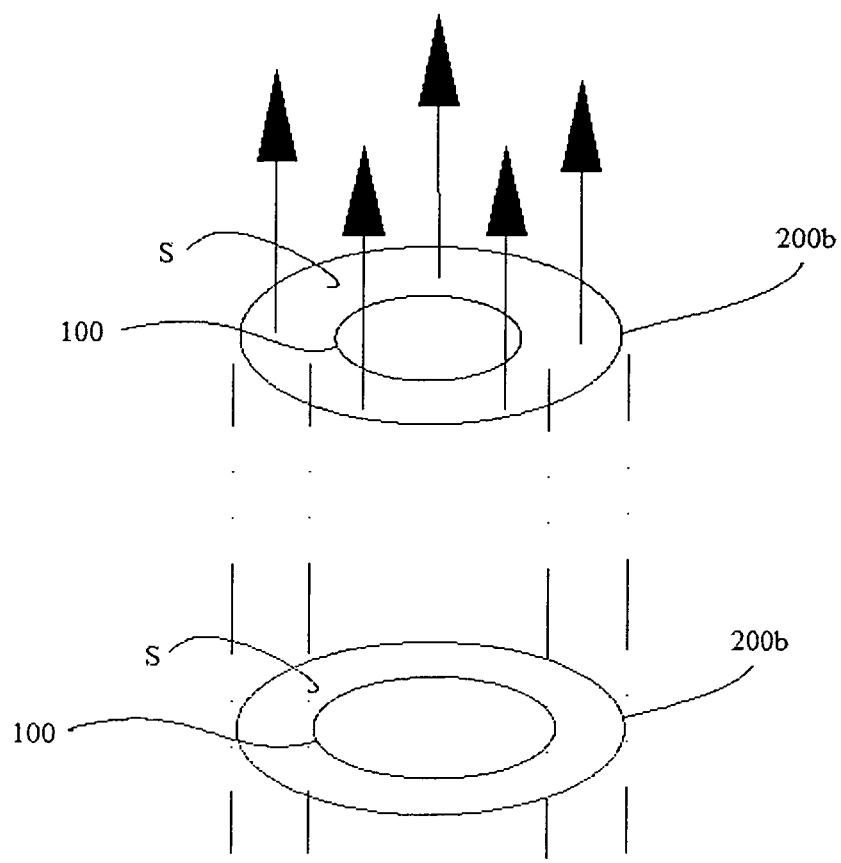
FIG. 13 is a schematic view showing the change of a gap S between the tower and the floating body 200 when the floating body in FIG. 4 is at different positions of the up and down floating.
Figure 14:
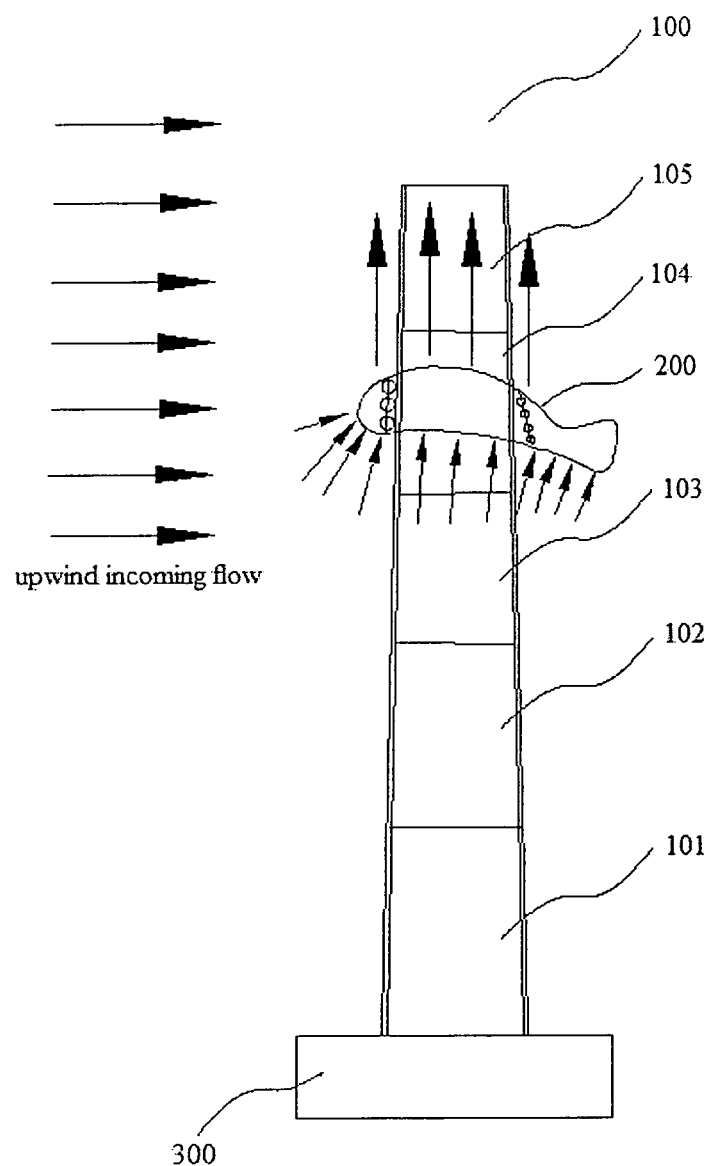
FIG. 14 is a schematic view showing airflow flowing upward from the gap S.

For the measures to prevent the floating body 200 from falling off from the top of the tower 100, references can also be made to FIGS. 13 and 14. FIG. 13 is a schematic view showing a change of a gap S between the tower and the floating body 200 when the floating body in FIG. 4 is at different positions of the up and down floating; FIG. 14 is a schematic view showing airflow flowing upward from the gap S.

As shown in FIG. 13, a diameter of the tower 100 gradually decreases from bottom to top. When the floating body 200 floats up, the gap S between the floating body 200 and the outer wall of the tower 100 may gradually increase, and when the floating body 200 floats up to the top of the tower 100, the gap S is the largest. In this solution, for the central through-hole 207 of the floating body 200, a lateral dimension is preferably designed to satisfy the requirement that, at the top of the tower 100, a predetermined distance is provided as the gap S between the floating body 200 and the tower 100, to break the buoyancy force generated by the upwind incoming flow. When the gap S between the floating body 200 and the outer wall of the tower 100 is large enough, the buoyancy force of the floating body 200 can be weakened. Specifically, when the gap S is large enough, it is equivalent that the upper and lower surfaces of the floating body 200 are in communication with each other, which breaks the condition of generating the fluid pressure difference between the upper and lower surfaces, thus the buoyancy force may no longer increase, thereby achieving self-balance.

The word "lateral" in the above lateral dimension means the direction in which a distance between the floating body 200 and the outer wall of the tower 100 can be calculated. In a case that the central through-hole 207 of the floating body 200 is circular, the lateral dimension is a radial dimension. The central through-hole 207 may also have other shapes, such as an oval shape, in this case, the lateral dimension is not unique.

The size of the central through-hole 207 of the floating body 200 may be determined according to an outer diameter of the top of the tower 100. In the field of fluid mechanics, the required size of the central through-hole 207 can be obtained through size calculation, simulation or wind tunnel test, and the size has a variety of values depending on different application situations. By this method, self-balance can be achieved without external forces this method can be used separately, or combined with the tether 600 together to prevent the floating body 200 from escaping.

The floating body 200 described in the above embodiments has the shape of a fish having the central through-hole 207, and surrounds the tower 100 to form a closed annular shape. It can be understood that, the present solution mainly utilizes the streamline shape of the floating body 200 to achieve the change of the attack angle, so as to destroy the up and down correlation of the airflow around the floating body 200, thereby suppressing the vortex-induced vibration. Moreover, the floating body 200 can float to further improve the effect of disturbing the boundary layer on the outer wall of the tower 100. The closed annular shape herein is mainly configured to prevent the floating body 200 from falling off from the tower 100. It can be understood that, the floating body 200 is not limited to a closed annular shape under this requirement. For example, the tail portion 202 of the floating body 200 may have an opening, as long as the floating body 200 can clamp the tower 100 in a radial direction. For another example, since the present solution mainly utilizes the front edge 201 to achieve the change of the attack angle of the airflow, the floating body 200 may not be of the annular shape and may also not have the tail portion 202. Two sides of the floating body 200 are tied by a pulling rope, or the floating body 200 may not float up and be directly positioned on the tower 100, be positioned on the tower 100 and yaw and rotate with the wind, which can achieve the purpose of suppressing vortex-induced vibration to some extent.

Therefore, the "surrounding" described in this embodiment does not require that the floating body 200 surrounds the tower in a closed annular shape, as long as the front edge 201 can realize the change of the attack angle of the upwind incoming flow, therefore, at least half of the tower 100 is required to be surrounded.

As described hereinbefore, the floating body 200 in the present solution is specifically a fish-shaped bionic structure, and the floating body 200 includes a tail portion 202 opposite to the front edge 201, as a "fish tail" shown in FIG. 5-2. With respect to the tower 100, a distance between the front edge 201 and the tower is smaller than a distance between the tail portion 202 and the tower 100.

With this arrangement, when the direction of the upwind incoming flow changes, with the existence of the tail portion 202, a force moment of the upwind incoming flow on the tail portion 202 is greater than a force moment of the upwind incoming flow on the front edge 201, so that the floating body 200 swings. As shown in FIG. 5, the floating body 200 may rotate to align the front edge 201 with the upwind incoming flow to achieve the automatic alignment. The front edge 201 of the floating body 200 can always be aligned with the upwind incoming flow to achieve the change of the attack angle and the aerodynamic configuration, so that the floating body 200 can always function to suppress vortex-induced vibration by timely rotation according to the wind direction.

Obviously, due to the instability of wind speed, and the complexity of the force applied on the floating body 200 in the air, the floating body 200 may continuously swing with the change of the wind direction during the rotation process. The floating body 200 may also collide with the outer wall of the tower 100 in front, rear, left and right directions, thus further disturbing the airflow close to the floating body 200, suppressing the Karmen vortex street phenomenon, thereby suppressing the vortex-induced vibration.

As shown in FIG. 5-2, the front edge 201 of the floating body 200 expands and elongates towards two sides, then gradually contracts backward, and then gradually expands to form the tail portion 202. In other words, two sides of the floating body 200 are also streamlined and symmetrically arranged. After the upward incoming flow passes through the front edge 201, the transition is smooth during the process of flowing backward, and the airflow is subjected to a certain resistance at the expanded tail portion 202. Therefore, the airflow accumulates between a contracting section which contracts previously and an expanding section which expands afterwards (i.e. in a "waist" portion of the "fish"), thus preventing the vortices formed by the upwind incoming flow from falling off, thereby suppressing the vortex-induced vibration.

An outer edge of the tail portion 202 of the floating body 200 is a cambered surface, which is conducive to reducing the resistance of the floating body 200 to the fluid flowing around the floating body, and is beneficial to reducing the resistance of the crosswind swing of the tail portion 200.

The floating body 200 is preferably designed as a symmetrical structure, and a symmetrical center line is a line connecting a center of the front edge 201 and a center of the tail portion 202. When the floating body 200 surrounds the tower 100, the symmetrical centerline is actually in the same direction as the upwind incoming flow. As shown in FIG. 5-2, the fish-shaped floating body 200 is of the symmetrical structure. The floating body 200 with the symmetrical structure is favorable for relatively keeping balance of the floating body 200 under the action of the airflow, so as to ensure that the front edge 201 of the floating body 200 can always be aligned with the upwind incoming flow.

In describing the structure of the floating body 200 hereinbefore, the floating body 200 or the floating body 200 capable of floating up is diversified in structure, so the shape of the floating body 200 is not limited to the "fish shape" in the drawings. For example, when only the attack angle is to be changed, the two sides of the floating body 200 are not required to be streamlined. Moreover, a negative attack angle can be formed by inclining a lower surface of the front edge 201 downward without requiring the lower surface of the entire floating body to be designed to incline downward. In FIG. 4, the lower surface of the front edge 201 of the floating body 200 is inclined downward, and then inclined slightly upward, and further the entire lower surface is inclined downward, to change the airflow direction, and form a relative large downward negative attack angle (FIG. 8). The slightly upward and then downward inclination herein helps to obtain the buoyancy force.

Figure 15:
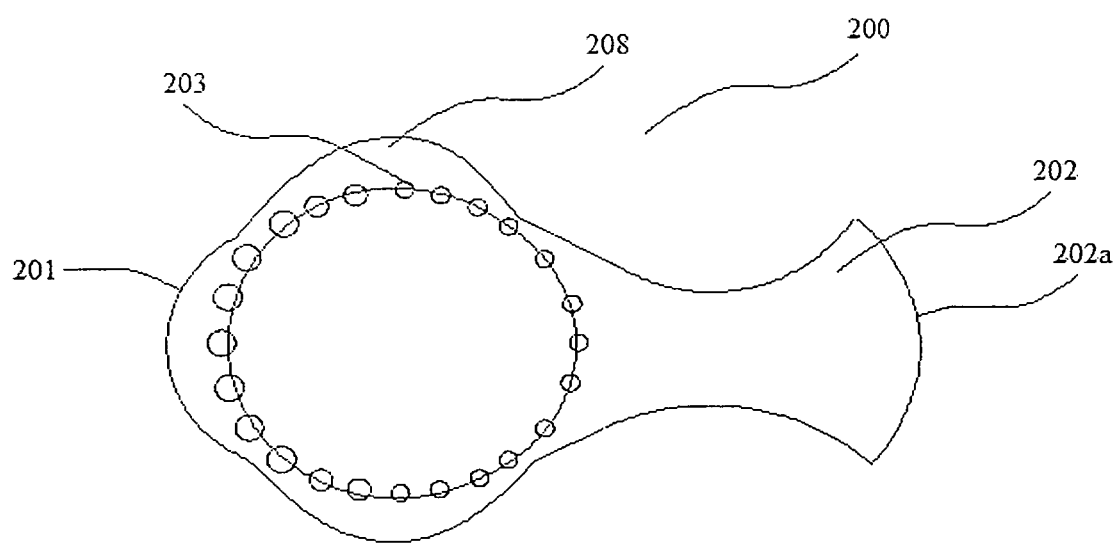
FIG. 15 is a top view showing another floating body.
Figure 16:
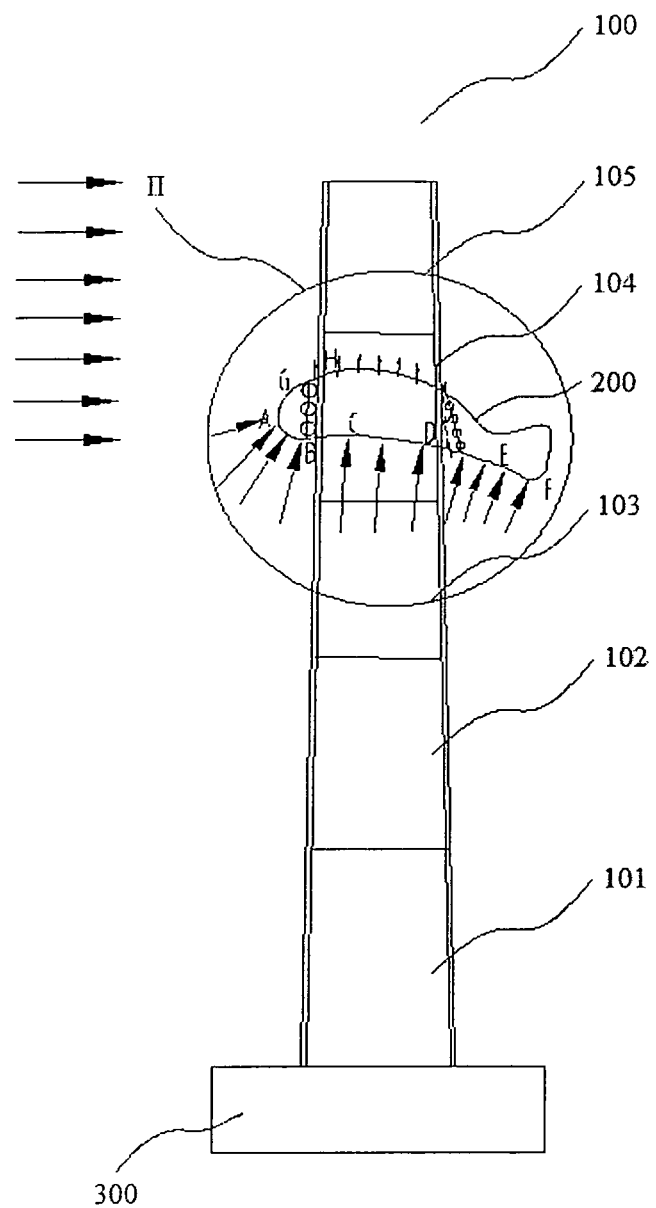
FIG. 16 is a schematic view showing the airflow at different positions of the floating body in FIG. 4 when the floating body floats up.

In addition, from the perspective of the tail portion 202 swing with the wind direction, the two sides of the floating body 200 may each be provided with a protrusion 208 similar to the front edge 201, as shown in FIG. 15, which is a top view showing another floating body.

The two sides of the structure of the floating body 200 are each provided with the protrusion 208, which can make the floating body 200 to respond to the change of the wind direction of the upwind incoming flow more quickly, thereby the front edge 201 can be quickly and automatically aligned with the upwind incoming flow.

As described above, when the floating body 200 can float up, the airflow can be further disturbed to break the frequency consistency of the vortex shedding, and thus to suppress the vibration. In order to improve the floating performance of the floating body 200, the annular floating body 200 may have an annular cavity (similar to a swimming ring), an interior of the annular cavity is filled with gas, and the density of the gas is smaller than the density of the air. The gas filled herein may be, for example, hydrogen, helium or the like. In this case, the buoyancy force of the floating body 200 is the sum of a buoyancy force generated by the gas density difference and a buoyancy force of the floating body 200 generated based on the upwind incoming flow (a speed thereof is generally up to 3 to 4 m/s), so that the floating of the floating body 200 is easier.

Based on purposes of floating and collision, the floating body 200 may be wholly made of a material that is lightweight, good in airtightness and abrasion-resistant. For example, the material may be a canvas, a polymer material, a flame-retardant polymer material or the like. Good airtightness can prevent internal air leakage, and also can prevent adsorption of rainwater which increases the weight. Abrasion resistance can meet the requirements of collision and swing, and also prevent the floating body 200 from being scratched by natural objects such as branches and the like.

Continuing to refer to FIGS. 5-3 and 5-4, the floating body 200 has an inner side outer surface 200b facing the tower 100, and an outer side outer surface 200a away from the tower 100. The inner side outer surface 200b is provided with a plurality of elastomers capable of squeezing the tower 100. The elastomer herein may be a solid body made of an elastic material, or a cavity. In a case that the elastomer is a cavity, a gas may be sealed in the cavity. In this embodiment, elastic spheres 203 are provided, a part of (may be a half or other ratios, and a half being exposed is taken as an example in the present solution) the elastic spheres 203 are exposed on the inner side outer surface 200b of the floating body 200, which is defined as an exposed portion 203b, and the exposed portion 203b forms the elastomer. The other part of the elastic spheres 203 are fixed inside the annual cavity of the floating body 200, which is defined as a hidden portion 203a.

Figure 17:
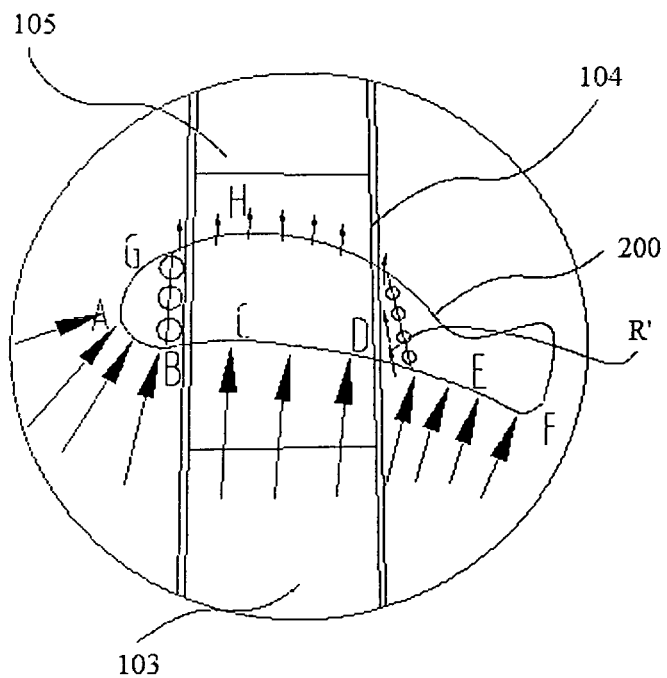
FIG. 17 is a partially enlarged schematic view showing a portion II in FIG. 16.
Figure 18:
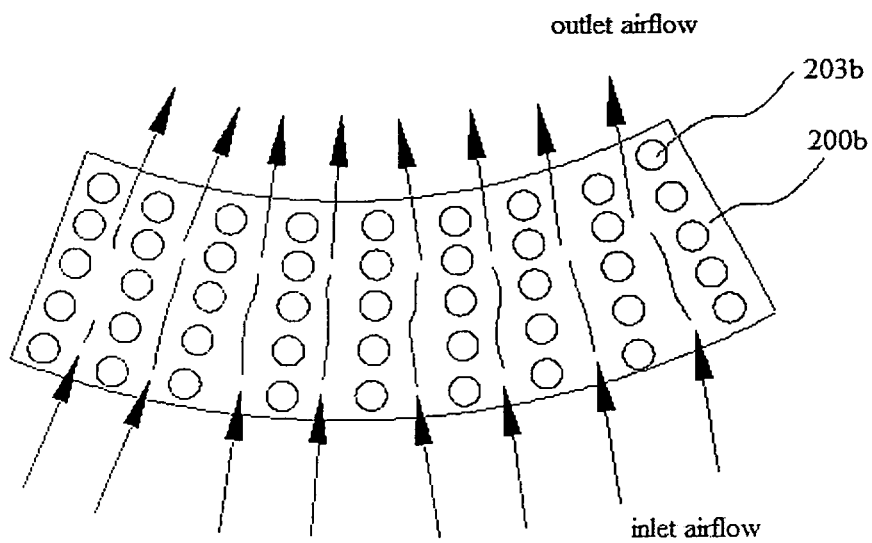
FIG. 18 is a schematic view showing a part of an inner side outer surface of the floating body in FIG. 4 being unfolded, wherein an elastic sphere 203 is not squeezed.
Figure 19:
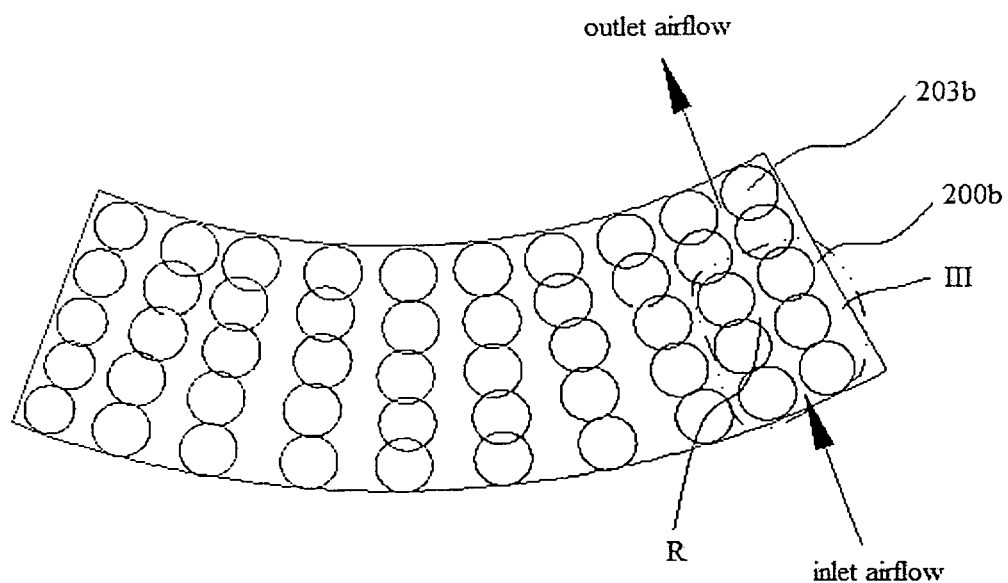
FIG. 19 is a schematic view showing the elastic sphere in FIG. 18 being squeezed.
Figure 20:
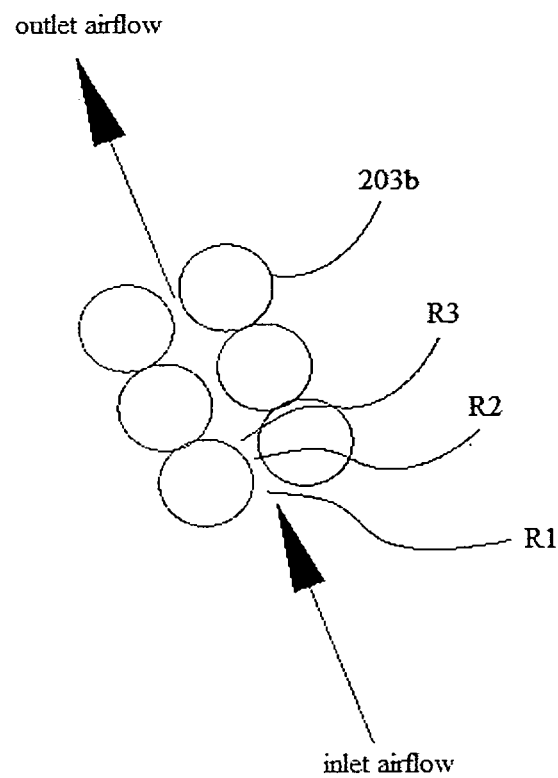
FIG. 20 is a partially enlarged schematic view showing a portion III in FIG. 19.

Referring to FIGS. 16 to 20, FIG. 16 is a schematic view showing the airflow at different positions of the floating body in FIG. 4 when the floating body floats up; FIG. 17 is a partially enlarged schematic view showing a portion II in FIG. 16; FIG. 18 is an schematic view showing a part of an inner side outer surface 200b of the floating body 200 in FIG. 4 being unfolded, wherein an elastic sphere 203 is not squeezed; FIG. 19 is a schematic view showing the elastic sphere 203 in FIG. 18 being squeezed; and FIG. 20 is a partially enlarged schematic view showing a portion III in FIG. 19.

As shown in FIG. 18, the elastic spheres 203 are distributed along entire circumferential and height directions of the inner side outer surface 200b of the tower 100, that is, a plurality of rows of elastic spheres 203 are arranged along the circumferential direction. The elastic sphere 203 includes the exposed portion 203b. The elastic spheres 203 are arranged to allow a flow channel R to be formed between two adjacent rows of exposed portions 203b, that is, the elastic spheres 203 are preferably arranged regularly so as to form a substantially straight flow channel R, which facilitates pass of the airflow.

As shown in FIG. 17, when the upwind incoming flow passes through the floating body 200, a part of the airflow inclines downward after flowing along the front edge 201 (an G-A-B area shown in the figure) to pass through the C-D-E-F area, a part of the airflow flows to the back of the tower 100, and still a part of the airflow may be sucked from bottom to top into the annular gap S between the floating body 200 and the outer wall of the tower 100 (understanding this in conjunction with FIG. 5-2), and flows upward from the gap S, that is, the airflow H shown in the figure. The airflow H flows along the convergent-divergent flow channel R shown in FIGS. 18 to 20. As shown in FIG. 20, a flow channel unit is formed among the exposed portions 203b of six elastic spheres 203. When the upwind incoming flow acts on the floating body 200, a portion of the floating body 200 in a direction corresponding to the acting force may abut against the outer wall of the tower 100, then the outer wall of the tower 100 may be squeezed, and then the convergent-divergent flow channel R among the exposed portions 203b may be converted from a state in FIG. 18 to a state in FIG. 19, thus the flow channel becomes narrower.

It can be understood that, when the exposed portions 203b of the elastic spheres 203 are squeezed against the outer wall of the tower 100, the corresponding gap S at this position is actually divided into a plurality of rows of the convergent-divergent flow channels R by the plurality of rows of exposed portions 203b at this position.

As shown in FIG. 20, in the circumferential direction, the gap between the exposed portions 203b of two adjacent elastic spheres 203 becomes narrower, and the air therebetween is squeezed, and the convergent-divergent flow channel R formed here is like an internal flow channel of a convergent-divergent nozzle. As shown in FIG. 20, starting from an inlet, a convergent flow channel R1 (the flow channel is narrowed), a throat R2 (a width of the flow channel is roughly unchanged), and a divergent flow channel R3 (the flow channel is widened) are arranged in sequence, and then, a convergent flow channel R, a throat R2, and a divergent flow channel R3 are further arranged, that is, the convergent-divergent flow channel R is defined to include convergence and divergence flow channel sections. This structure can narrow the original flow channel by means of the squeezing process, and in the narrowing process, elastic compression and adiabatic compression are performed to the airflow, and thus the airflow is accelerated. When the floating body 200 has a relatively long tail portion 202, the airflow in all directions of the circumference of the floating body 200 may be actually accelerated during the swing process, which is not limited to the position of the front edge 201.

The airflow H squeezed out of the convergent-divergent flow channel R has a "blowing" function for the boundary layer of the upper portion of the tower 100 (that is, the convergent-divergent flow channel R is extended upward and downward), thereby interfering the airflow flowing around the wall of the upper portion of the tower 100, destroying the boundary layer at this position, suppressing and destroying the formation of the Karman vortex street, and suppressing the lateral vibration of the tower 100, i.e., suppressing the vortex-induced vibration. The intention of the present application is to fully utilize natural force, to achieve an optimal airflow disturbing and destroying effect on the premise of environmental protection, to suppress the occurrence of Karman vortex street phenomenon, so as to hinder the occurrence of vortex-induced vibration or reduce the vibration.

As described above, a purpose of providing the elastic spheres 203 herein is to squeeze against the outer wall of the tower 100 so as to form a convergent-divergent flow channel, to accelerate the airflow entering between the outer wall of the tower 100 and the floating body 200. Therefore, the elastic spheres 203 may be filled with gas, but in order to ensure the safety of squeezing, the elastic spheres 203 may be filled with a safe gas which is not apt to explode, such as helium.

In addition, the whole elastic sphere 203 provided herein is only partially exposed, and further includes a hidden portion 203a hidden inside the floating body 200. Each of the elastic spheres 203 is independent, and when the elastic spheres 203 are squeezed, the gas inside the exposed portion 203b moves toward the hidden portion 203a, an activity space of single elastic sphere 203 is enlarged, so as to construct a convergent-divergent flow channel, which accelerates the flowing of the airflow with the help of the energy during the collision process. Of course, a plurality of hemispheres or partial spheres of other proportions may also be formed on the inner side outer surface 200b of the floating body 200. In addition, the elastomer is not limited to the elastic sphere 203. The shape of the sphere herein is to facilitate the formation of the convergent-divergent flow channel during squeezing, therefore, the elastomer may be an ellipsoid, a triangle body or the like. In fact, when the elastic spheres 203 are not squeezed, the convergent-divergent flow channel R is also formed between two adjacent rows of elastic spheres 203. However, a width of the convergent-divergent flow channel R is large, and there is a gap between the convergent-divergent flow channel R and the outer wall of the tower 100, thus the convergent-divergent flow channel R is an open flow channel, the accelerating effect of which is not as obvious as that in a squeezed state.

Referring to FIG. 5-2, at the front edge 201 of the floating body 200, the density of the elastic spheres 203 is smaller than the density of the elastic spheres 203 at other positions. The front edge 201 of the floating body 200 faces toward the upwind incoming flow, the elastic spheres 203 are subjected to a larger squeezing force, leading to a larger deformation, so the density can be set to be small. The elastic spheres 203 at other positions are subjected to a relatively small squeezing force, leading to a small deformation, in order to form a relatively suitable convergent-divergent flow channel R, the density can be set to be relatively large.

Referring to FIG. 17, it can be seen that, the cross-section of the central through-hole 207 of the floating body 200 gradually becomes smaller from bottom to top. Then, when the upwind incoming flow acts on the front edge 201 of the floating body 200 to squeeze the same, a convergent channel R' is formed between one side of the tail portion 202 and the outer wall of the tower 100, to squeeze the airflow passing through this gap. Similar to the principle of the above convergent-divergent flow channel, the purpose of accelerating the airflow at this position so as to interfere the boundary layer at this position of the tower 100 can also be achieved, thereby suppressing the vortex-induced vibration. Of course, in addition to a region of the tail portion 202, convergent channels R' may be formed between other regions of the squeezed position of the floating body 200 and the outer wall of the tower 100 (FIG. 17 shows only the regions of the front edge 201 and the tail portion 202). That is, when the upwind incoming flow acts on the floating body 200, the convergent-divergent flow channel R and the convergent channel R' function simultaneously to blow air upwards to destroy the flow around the boundary layer.

Figure 21:
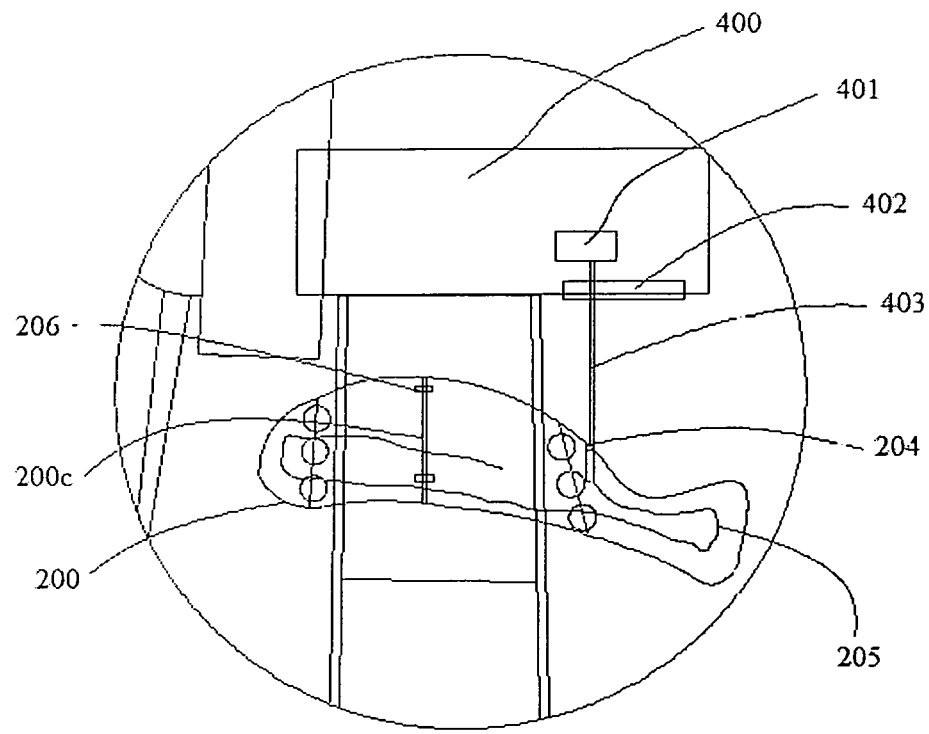
FIG. 21 is an enlarged schematic view showing a recovery device with the recovered floating body in FIG. 4.
Figure 22:
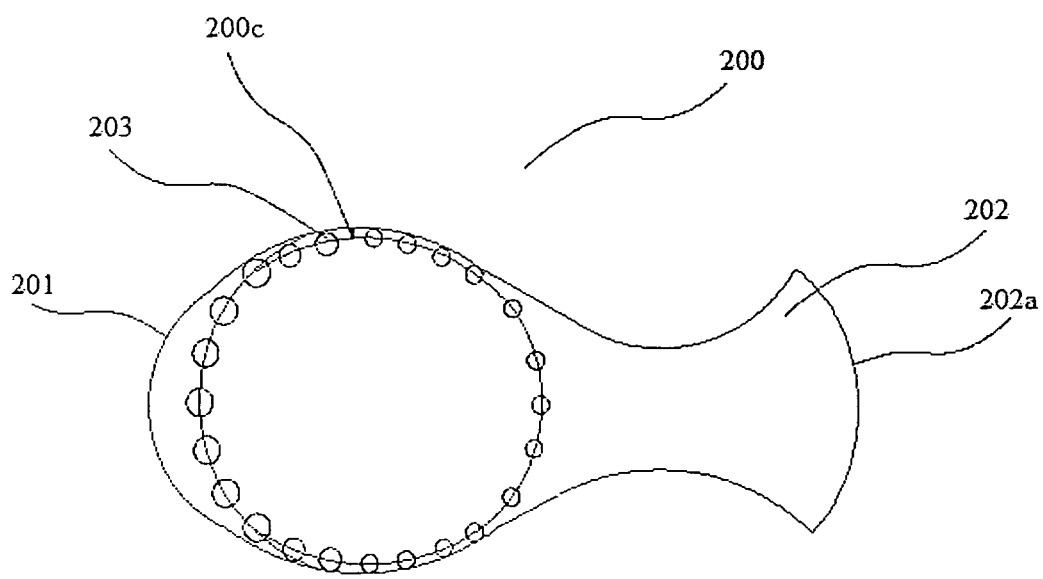
FIG. 22 is a top view showing the floating body in FIG. 21.

Referring to FIGS. 21 to 22, FIG. 21 is an enlarged schematic view showing a recovery device with the recovered floating body 200 in FIG. 4; and FIG. 22 is a top view showing the floating body 200 in FIG. 21.

The floating body 200 in this embodiment has an butting surface 200c, and a complete annular shape can be formed after butting and locking along the butting surface 200c. As shown in FIG. 22, at the position of the butting surface 200c, the floating body 200 can be abutted and locked to form an annular shape, or can be unlocked and opened to become an opened annular shape. The arrangement of the butting surface 200c facilitates sleeving on the tower 100 and also facilitates recovery.

The annular cavity of the floating body 200 may be inflated, and a valve core 204 may be provided. The valve core 204 communicates with an internal pipeline 205 of the floating body 200 to achieve inflation and deflation.

As shown in FIG. 21, a nacelle 400 is installed on the top of the tower 100, and a rotor 500 is installed outside the nacelle 400. A gas collecting device 401 is further arranged inside the nacelle 400, and a recovery pipe 403 is provided. A bottom of the nacelle 400 is provided with a recovery opening 402, and the recovery pipe 403 passes through the recovery opening 402. One end of the recovery pipe 403 is connected to the valve core 204 of the floating body 200 outside the nacelle 400, and the other end of the recovery pipe 403 is connected to the gas collecting device 401 inside the nacelle 400, so that the gas in the floating body 200 can be recovered to the gas collecting device 401. That is, when the floating body 200 is not required to be used, the recovery pipe 403 can be inserted into the valve core 204, to discharge the gas filled into the annular cavity of the floating body 200, so as to facilitate the hoisting of the floating body 200 and the recovery of the floating body 200 into the nacelle 400 from the recovery opening 402 of the nacelle 400.

As described above, in order to increase the buoyancy force, the floating body 200 may be filled with a gas having a density smaller than the air density, such as hydrogen, helium or the like. The gas can be recycled after recovery to save resources and reduce cost. The floating body 200 can be made of a folding material, so that when the gas is discharged for recovery, the floating body 200 can be folded, which facilitates the storage and reduces an occupied space.

The above floating body 200 has the butting surface 200c. In this case, a wireless electronic lock 206 may also be provided, and the butting surfaces 200c are locked by the wireless electronic lock 206 to form a complete annular shape. Meanwhile, a remote controller is provided in the nacelle 400 in order to wirelessly control the electronic lock. Thus during recovery, the wireless electronic lock 206 can be opened remotely in the nacelle 400, so that the floating body 200 can leave the tower 100 and be hoisted and recovered into the nacelle 400. Of course, the remote controller may also be provided on the ground or at a bottom inside the tower 100, so that the operator can control it more conveniently.

The gas collecting device 401, the remote controller and the like are all provided in the nacelle 400. Since the upper portion of the tower 100 has the maximum demand for vibration suppression, the floating body 200 is preferably designed to float up to the top of the tower 100, which facilitates the practical operation of recovering the floating body 200 into the nacelle 400 at the top of the tower.

The floating body 200 surrounding the tower 100 can be used during a hoisting stage of the tower 100.

Figure 23:
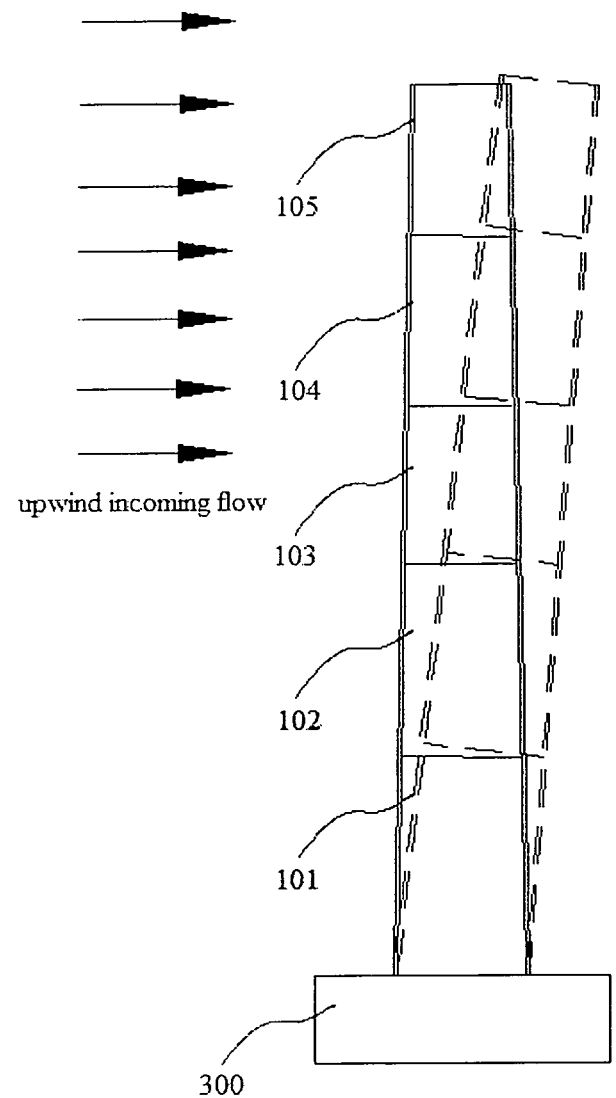
FIG. 23 is a schematic view showing pitching vibration of the tower.
Figure 24:
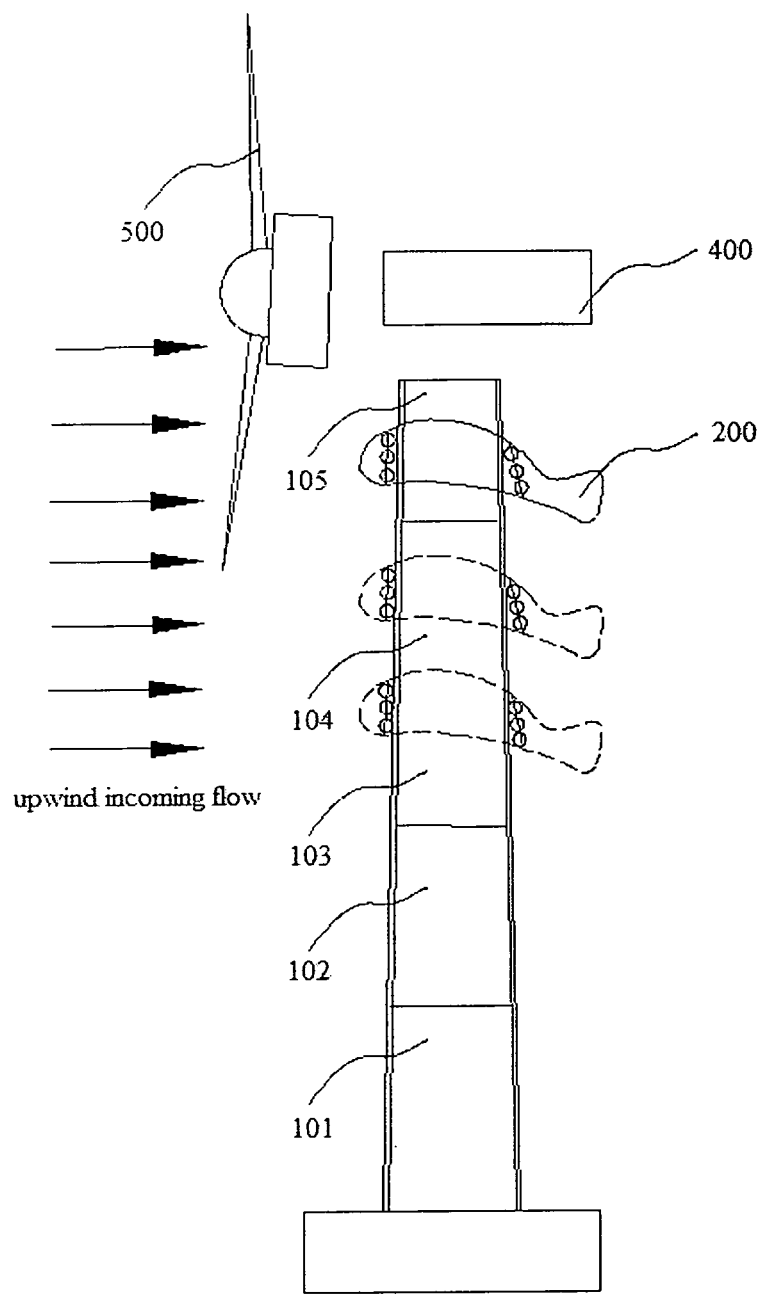
FIG. 24 is a schematic view showing a process of nacelle installation when the vibration is suppressed after the floating body is provided.
Reference numerals in FIGS. 1-1 to 3-6.

As shown in FIG. 23, FIG. 23 is a schematic view showing a pitching vibration of the tower 100; and FIG. 24 is a schematic view showing a process of the tower 100 being mounted with the nacelle 400 when the vibration is suppressed after providing the floating body 200.

When the floating body is not provided, similar to the description in the background, a vortex-induced vibration may occur to the tower 100. FIG. 23 shows that after the hoisting of the entire tower 200 is finished, a pitching vibration of the entire tower 100 occurs under the effect of the upwind incoming flow, and bolts at the position of the foundation base 300 may be damaged. In fact, during the hoisting process of the tower 100, the installed tower section may also vibrate, resulting in difficulty in installing the tower section above this installed tower section. After finishing the hoisting of the tower 100, the nacelle 400 and the rotor 500 above the tower 100 are difficult to be installed.

As shown in FIG. 24, after the floating body 200 is provided, the vibration of the tower 100 is suppressed, which avoids the vibration or reduce the vibration amplitude, and thus avoids damage to the connecting bolts or other fasteners, thereby ensuring the reliability of the installation, reducing the impact of weather on the construction, greatly shortening the construction period, reducing construction costs, and also improving the safety of the construction.

Specifically, in the construction, when the first tower section is hoisted, the floating body 200 may be arranged to surround the first tower section 101. However, as described above, a destructive force of the vibration is mainly embodied in an upper position having a relatively large height. Therefore, in terms of FIG. 24, in a case that the tower is hoisted in sections, the floating body 200 may be provided to surround the tower section starting from the third tower section 103 or the fourth tower section 104, and in a case that a floating body 200 having a floating function is provided, the floating body can automatically floats up to a high-level tower section, so as to continuously suppress the vibration. After finishing the hoisting of all tower sections, the floating body 200 is located at the fifth tower section 105 at the top of the tower 100, and the nacelle 400 and the rotor 500 are installed under the condition that the vibration is suppressed. After completing the installation, the floating body 200 may be detached to be recovered into the nacelle 400 by the above recovery method for reuse.

It should be noted that, after finishing the hoisting of the tower 100, the floating body 200 may also be continuously used without being recovered, to continuously function to suppress the vibration of the installed tower 100. Of course, the recovery operation can be determined according to actual requirements.

In summary, the present application is focused on the destructive phenomena such as resonance and Karmen vortex street which are likely to occur after the tower 100 being coupled with the airflow from the hoisting of the tower 100, because the wind turbine generator system is in the airflow during the installation process. Therefore, it is necessary to construct a protection system, namely the floating body 200 described in the embodiments, which is pre-installed around several sections at the upper portion of the tower 100 during the construction of the wind power plant. The floating body 200 uses the natural force and airflow to destroy a flow filed around the tower 100, in order to make the protection system to change the flow filed on and around the surface of the tower 100, prevent the occurrence of the vortex street phenomenon of the tower 100, prevent the amplification of the vortex-induced response of the tower 100, and suppress the vortex-induced vibration of the tower 100.

It should be noted that, the tower is taken as an example for description hereinbefore, and it can be understood that, similar enclosures can all employ the above manner of using the tether to control the floating body to float up and down to suppress the vibration, for example, the enclosure may be a television tower or an anemometer tower or the like. The floating body can be used or detached during installation or after installation according to actual requirements.

The embodiments described hereinabove are only preferred embodiments of the present application. It should be noted that, for those skilled in the art, a few of modifications and improvements may be made to the present application without departing from the principle of the present application, and these modifications and improvements are also deemed to fall into the scope of the present application defined by the claims.

What is claimed is:

1. A floating body device for suppressing vibration of an enclosure, comprising a floating body surrounding the enclosure and an excitation device configured to excite the floating body to float up and down; wherein the excitation device comprises a tether connected to the floating body to prevent the floating body from falling off from the enclosure; and wherein the excitation device further comprises a rope actuator, one end of the tether is connected to the floating body, the other end of the tether is connected to the rope actuator; the rope actuator is configured to control the tether to extend and retract, so as to actively excite the floating body to float up and down; and further comprises:

a follow-up system supporting and rotating platform on which the rope actuator is arranged, a track fixed on a foundation base or the enclosure, and a driving motor used to drive the follow-up system supporting and rotating platform to move along the track, wherein the follow-up system supporting and rotating platform is configured to rotate around the enclosure when moving along the track, to allow the tether, the rope actuator and the floating body to follow.

2. The floating body device for suppressing vibration of the enclosure according to claim 1, wherein the rope actuator comprises a winch wound around by the tether and a servo motor used to control the winch to rotate.

3. The floating body device for suppressing vibration of the enclosure according to claim 1, further comprising a pulley, wherein the tether is connected to the rope actuator via the pulley, and the pulley maintains the tether to pull the floating body in a vertical direction.

4. The floating body device for suppressing vibration of the enclosure according to claim 3, comprising at least two tethers controlled by the same rope actuator to extend and retract, wherein each of the tethers enters the same rope actuator via the corresponding pulley.

5. The floating body device for suppressing vibration of the enclosure according to claim 4, wherein the pulleys corresponding to the tethers each comprises a guiding pulley and a height-limiting pulley;
   after an outer side of the tether being wound around the guiding pulley, a direction of the tether is changed to be parallel with a direction of extension and retraction controlled by the rope actuator, and the tether is connected to the rope actuator via the height-limiting pulley; the height-limiting pulley is fixed with respect to the enclosure; and wherein
   further comprising a rotating ring, wherein the rotating ring runs through each of the guiding pulleys, and the rotating ring functions as an axle of all the guiding pulleys.

6. The floating body device for suppressing vibration of the enclosure according to claim 1, wherein the follow-up system supporting and rotating platform is provided with a balance weight.

7. The floating body device for suppressing vibration of the enclosure according to claim 1, further comprising a controller, wherein the controller controls the rope actuator and/or the driving motor to start or stop.

8. The floating body device for suppressing vibration of the enclosure according to claim 7, further comprising a vibration monitoring element for detecting the vibration of the enclosure and/or a wind speed sensor for measuring a wind speed at a location where the enclosure is located, wherein the controller controls the rope actuator to start or stop according to a detected vibration signal and/or a detected wind speed signal.

9. The floating body device for suppressing vibration of the enclosure according to claim 8, wherein the controller controls, by the rope actuator, a reciprocating extension/retraction range and a reciprocating extension/retraction speed of the tether.

10. The floating body device for suppressing vibration of the enclosure according to claim 9, further comprising a height detecting element for detecting a height at which the floating body is located, wherein the controller controls, according to the detected height, an extension/retraction range of the tether driven by the rope actuator.

11. The floating body device for suppressing vibration of the enclosure according to claim 10, wherein by combining a change of the vibration signal after the floating body is driven by the reciprocating extension/retraction of the tether to rise and fall, and the height at which the floating body is located, the controller analyzes a vibration controlling law of the floating body under a predetermined wind speed and height, so as to control the float body to determine a range and a speed of rise and fall according to the wind speed and the height.

12. The floating body device for suppressing vibration of the enclosure according to claim 11, further comprising a wireless receiver for receiving a signal from the height detecting element, wherein the height detecting element is arranged on the floating body, and the wireless receiver is arranged on the follow-up system supporting and rotating platform.

13. The floating body device for suppressing vibration of the enclosure according to claim 7, further comprising a wind indicator for detecting a wind direction of a location where the enclosure is located, wherein the controller controls the driving motor according to the detected wind direction, to make the follow-up system supporting and rotating platform follow the floating body to rotate;
   or further comprising a direction detecting element for detecting a direction of the floating body, wherein the controller controls the driving motor according to the detected direction of the floating body, to make the follow-up system supporting and rotating platform follow the floating body to rotate.

14. The floating body device for suppressing vibration of the enclosure according to claim 13, wherein the floating body has a streamlined front edge, and the front edge can face toward an upwind incoming flow, to allow the upwind incoming flow to form a positive attack angle and/or a negative attack angle; and
   the floating body also has a tail portion opposite to the front edge, and a distance between the front edge and an outer wall of the enclosure is smaller than a distance between the tail portion and the outer wall of the enclosure, so that under an action of the upwind incoming flow, the front edge can automatically align with the upwind incoming flow.

15. The floating body device for suppressing vibration of the enclosure according to claim 1, wherein the tether is an elastic tether, or the tether has at least one elastic section, to collect turbulent fluctuating energy of the upwind incoming flow, to excite and increase an up and down floating range of the floating body.

16. The floating body device for suppressing vibration of the enclosure according to claim 1, wherein the floating body is annular, and a lateral dimension of a central through-hole of the floating body satisfies the requirement that, at a top of the enclosure, a predetermined distance is provided as a gap between an inner wall of the central through-hole of the floating body and the outer wall of the enclosure, to break a buoyancy force generated by the upwind incoming flow, so as to achieve self-balance.

17. The floating body device for suppressing vibration of the enclosure according to claim 1, wherein the enclosure comprises a tower of a wind turbine generator system, a television tower or an anemometer tower.

* * * * *